(12) United States Patent
Kobayashi

(10) Patent No.: US 8,705,142 B2
(45) Date of Patent: Apr. 22, 2014

(54) TINT BLOCK IMAGE GENERATION PROGRAM, TINT BLOCK IMAGE GENERATION DEVICE, AND TINT BLOCK IMAGE GENERATION METHOD

(75) Inventor: Makoto Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1167 days.

(21) Appl. No.: 12/141,829

(22) Filed: Jun. 18, 2008

(65) Prior Publication Data

US 2009/0027704 A1    Jan. 29, 2009

(30) Foreign Application Priority Data

Jun. 18, 2007  (JP) ................................ 2007-160365
May 15, 2008  (JP) ................................ 2008-128241

(51) Int. Cl.
*G06F 15/00* (2006.01)
*H04N 1/60* (2006.01)

(52) U.S. Cl.
USPC .......... 358/3.28; 358/1.14; 358/1.9; 358/534; 358/535; 358/536

(58) Field of Classification Search
USPC .................................. 358/1.9, 1.14, 3.28, 3.1
See application file for complete search history.

(56) References Cited

U.S. PATENT DOCUMENTS

| 4,296,197 | A | 10/1981 | Stevie | |
| 2005/0174596 | A1* | 8/2005 | Uchida et al. | 358/1.14 |
| 2005/0219634 | A1* | 10/2005 | Murakami | 358/3.28 |
| 2007/0127056 | A1* | 6/2007 | Hirano et al. | 358/1.14 |
| 2009/0315907 | A1 | 12/2009 | Kobayashi | |

FOREIGN PATENT DOCUMENTS

| JP | 2005-151456 | 6/2005 |
| JP | 2009135961 A | 6/2009 |

* cited by examiner

*Primary Examiner* — Quang N Vo
(74) *Attorney, Agent, or Firm* — DLA Piper LLP (US)

(57) ABSTRACT

A computer readable storage medium stores a tint block image generation program for generating tint block image data for forming, on a print medium, a tint block image including a latent image portion which is reproduced by copying, and a background portion of which copy output density drops. The program has a latent image portion generation step of generating data of a plurality of first dots in the latent image portion based on a dot clustered screen; and a background portion generation step of generating data of a plurality of second dots and data of a plurality of third dots dispersed among the second dots and having a size smaller than the second dots. And the first dots in the latent image portion and the second dots in the background portion are arranged at positions on common displacement vectors in an area of the tint block image.

15 Claims, 23 Drawing Sheets

FIG.13
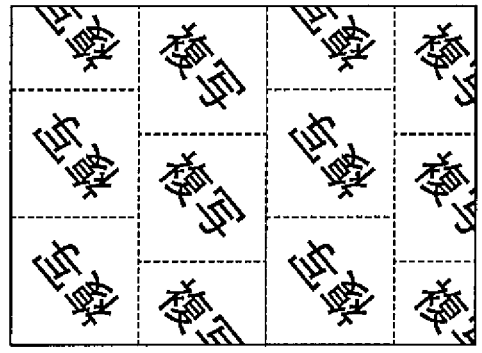
(a) SQUARED ARRANGEMENT
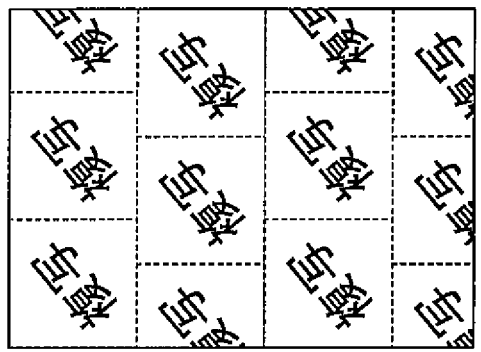
(b) OBLIQUE ARRANGEMENT
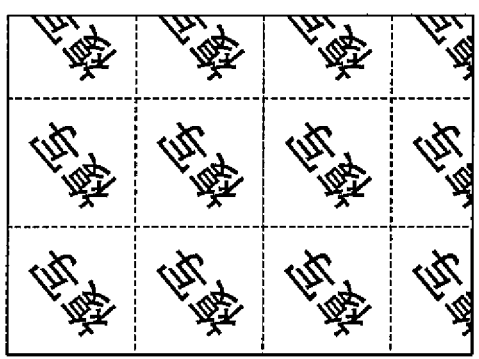
(c) INVERTED ARRANGEMENT

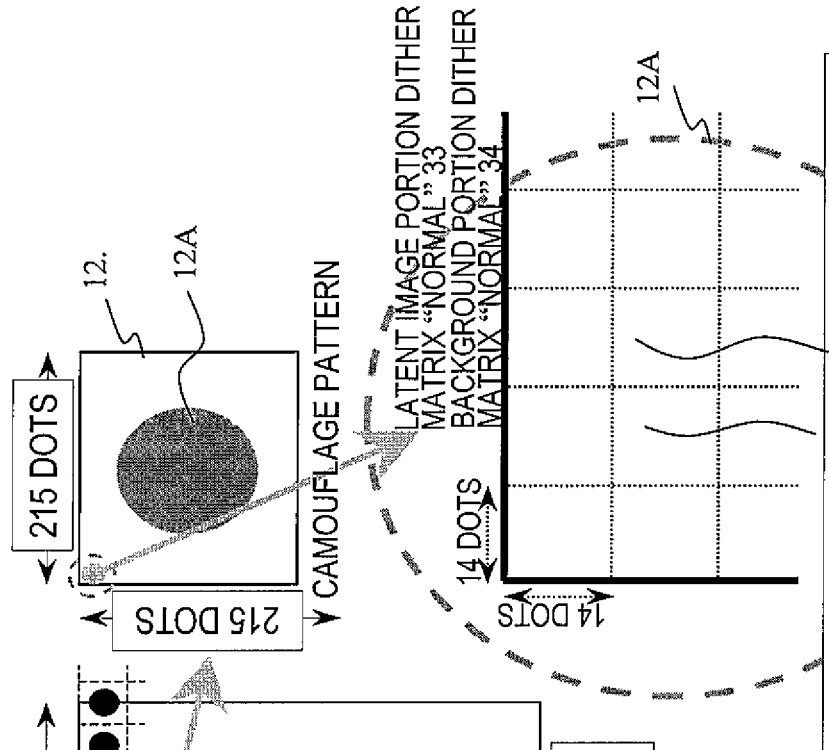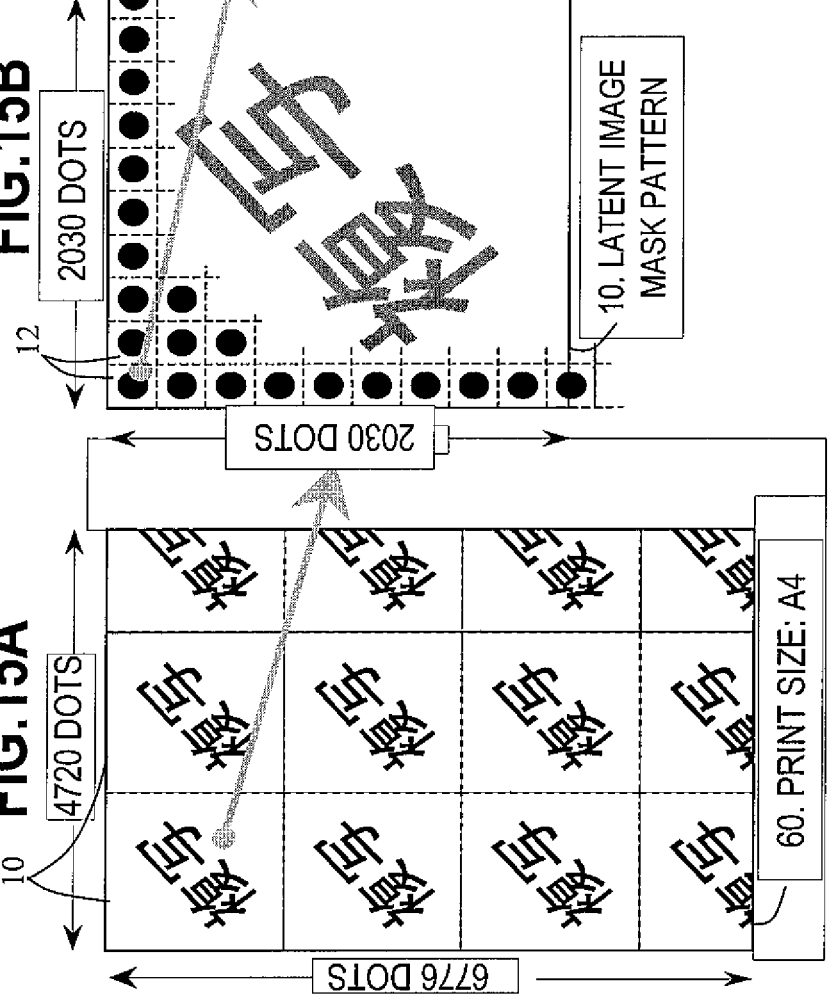

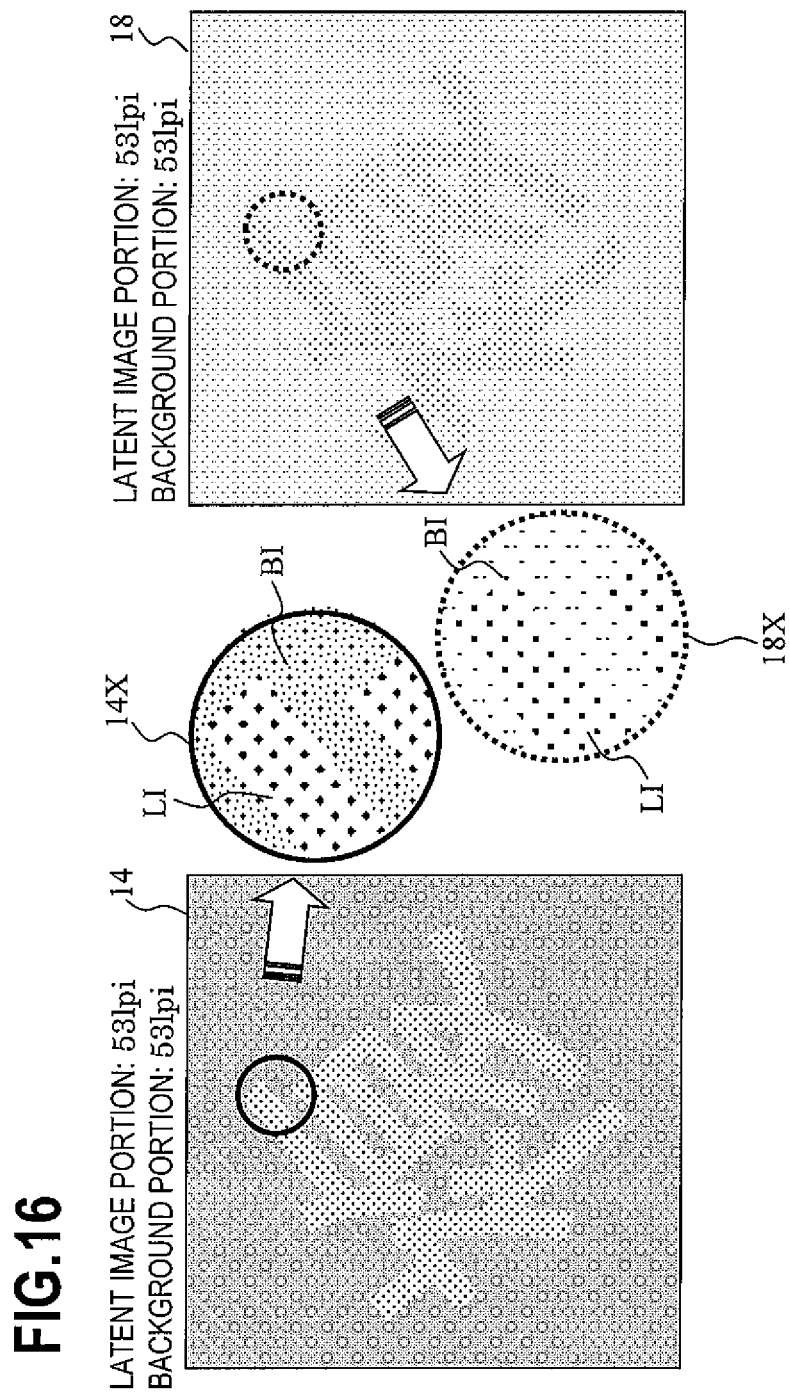

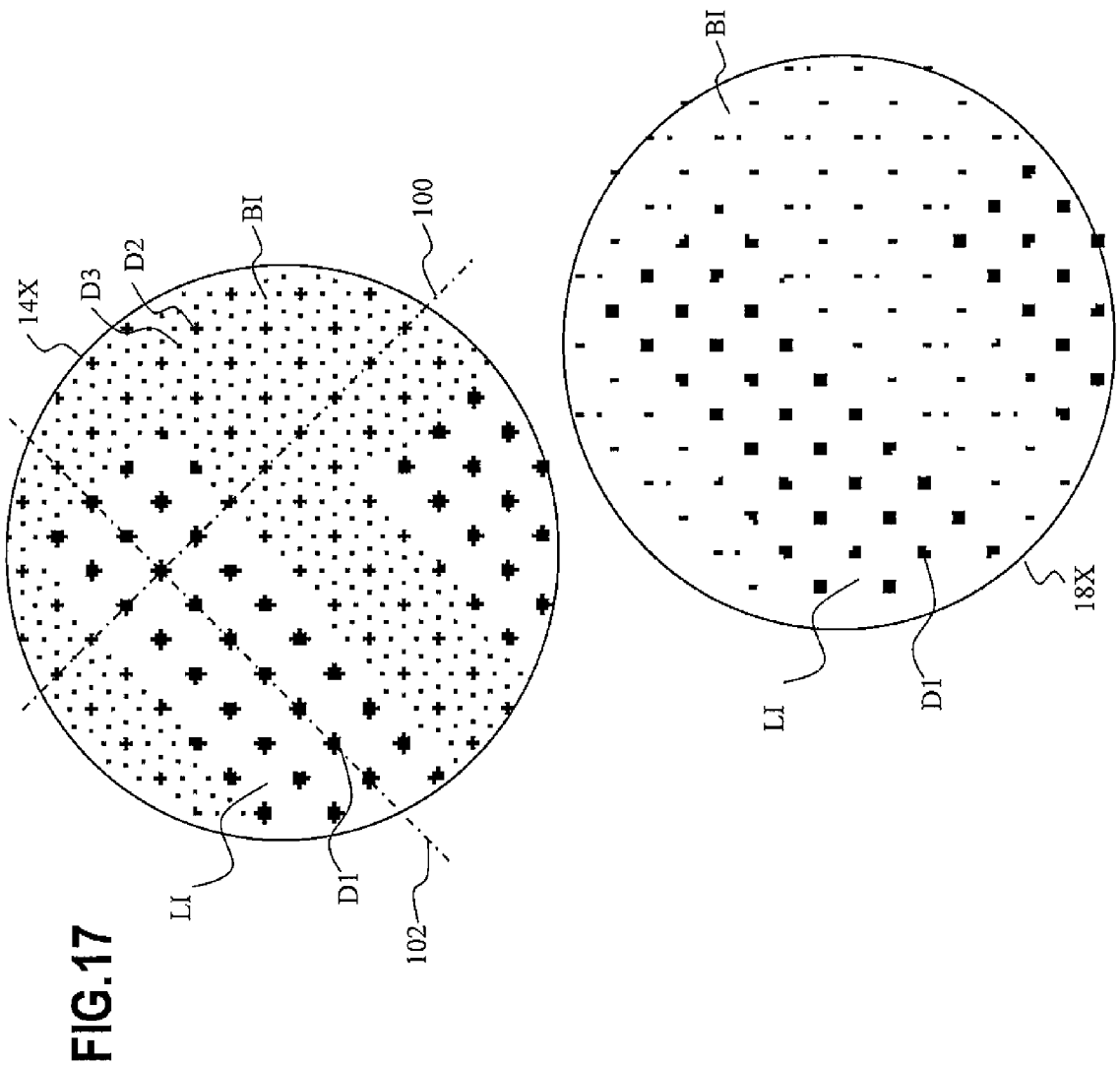

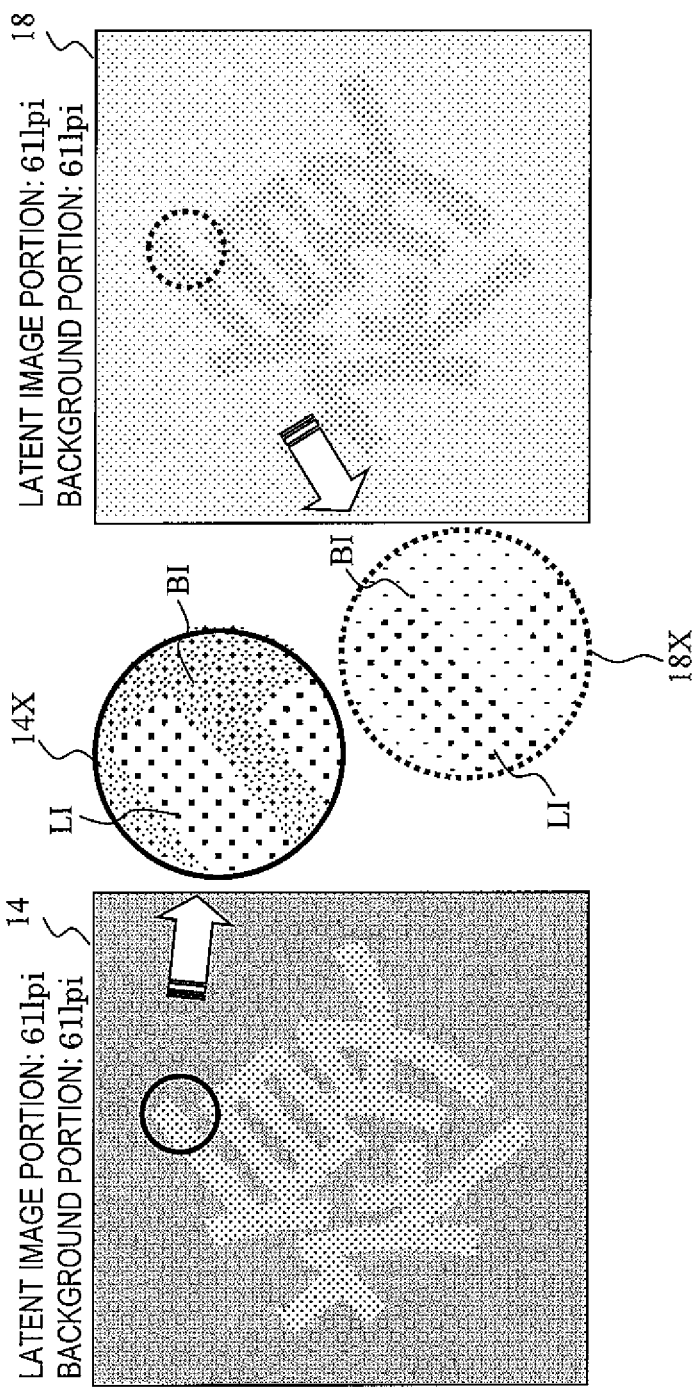

TINT BLOCK IMAGE GENERATION PROGRAM, TINT BLOCK IMAGE GENERATION DEVICE, AND TINT BLOCK IMAGE GENERATION METHOD

CROSS-REFERENCE TO RELATED APPLICATIONS

This application is based upon and claims the benefit of priority from the prior Japanese Patent Applications No. 2007-160365, filed on Jun. 18, 2007, and No. 2008-128241, filed on May 15, 2008, the entire contents of which are incorporated herein by reference.

BACKGROUND OF THE INVENTION

1. Field of the Invention

The present invention relates to a tint block image generation program, a tint block image generation device, and a tint block image generation method, and more particularly to a program and device for generating tint block image data for printing a tint block image on a print medium. The present invention also relates to a tint block image generation program and generation device, and tint block image generation method, having an effect to inhibit forgery by copying a print medium (original) on which a tint block image is printed based on the tint block image data, or an effect to distinguish between the original and the copy.

2. Description of the Related Art

The forgery inhibited tint block is combined with the original image as background, and allows distinguishing whether the print document is the original or the copy. Characters or images in the forgery inhibited tint block can hardly be identified in the original, but if copied, the characters or images in the tint block emerge. Using this, the original and the copy can easily be distinguished. Also the characters or images in the tint block emerge in copying, so if an original is generated combining with the forgery inhibited tint block, an attempt to copy the original is psychologically discouraged.

The forgery inhibited tint block is disclosed in Japanese Patent Application Laid-Open No. 2005-151456, and details follow according to this description.

Generally a forgery inhibited tint block is comprised of two areas: a "latent image portion" where dots printed in the original remain or decrease little by copying, and a "background portion" where dots printed in the original are lost or greatly decreased by copying. In other words, in the latent image portion, density changes little by copying, and the original image is reproduced as is, and in the background portion, density changes considerably by copying, and the original image disappears. The characters or images of the tint block are generated by these two areas, and the characters and images of the tint block are called the "latent image".

The densities of the latent image portion and the background portion are roughly the same, and in the original state, it is visually difficult to find such characters or images as "COPIED" of Japanese character are concealed in the tint block, but at the micro level, the background portion and latent image portion have different characteristics. When the tint block is copied, a density difference is generated between the latent image portion and the background portion, because of the difference of the respective change of density, which makes it easier to discern the characters or images of the tint block created by these two areas.

The latent image portion is comprised of clustered dots where individual dots cluster so that dots can be easily read when copying (scanning by copying), whereas the background portion is comprised of dispersed dots so that dots cannot be easily read when copying. By this, dots tend to remain in the latent image after copying, and dots tend to disappear in the background portion more easily than the latent image portion. Clustered dots or dispersed dots can be implemented by half tone processing using a different number of lines of half tone dots. In other words, half tone dots of which screen ruling is low are used to obtain a clustered dot arrangement, and half tone dots of which screen ruling is high are used to obtain a dispersed lot arrangement.

Generally a copier has a limitation in image reproducing capability, which depends on the input resolution in a step of reading the micro dots of a copy target original by a scanner, and the output resolution in a step of reproducing micro dots, read by the scanner, using a print engine. Therefore if isolated micro dots exist in the original, exceeding the limitation of the image reproducing capability of the copier, the micro dots cannot be perfectly reproduced in a copy, and the portions of the isolated micro dots disappear. In other words, if the background portion of the forgery inhibited tint block is created so as to exceed the limitation of the dots that the copier can reproduce, then large dots (clustered dots) in the forgery inhibited tint block can be reproduced by copying, but small dots (dispersed dots) cannot be reproduced by copying, and a concealed latent image appears in the copy. Even if the dispersed dots in the background portion do not disappear completely by copying, a density difference is generated between the background portion and the latent image portion after copying if the degree of loss of dots is high, compared with the clustered dots in the latent image portion, then a concealed latent image appears in the copy.

In the forgery inhibited tint block, a technology called "camouflage" is used to make it more difficult to discern characters or images concealed as a latent image. This camouflage technology is a method for arranging patterns, of which density is different from the latent image portion and the background portion, in the entire forgery inhibited tint block image, and in a macro view, the camouflage patterns, of which density is different from the latent image portion and the background portion, standout, making the latent image even more obscure. In other words, the contrast of the camouflage patterns is high, and the contrast of the latent image portion and the background portion is smaller than this, so the latent image is more effectively concealed because of optical illusion. Also the camouflage pattern can give a decorative impression on printed matter, and allows creating an artistically designed forgery inhibited tint block. Generally a camouflage pattern is created in binary, and the camouflage pattern is formed by not generating dots of the tint block in an area corresponding to the camouflage pattern. The above is an overview of the forgery inhibited tint block.

FIG. 1 shows an example of a latent image of a forgery inhibited tint block and a camouflage pattern. In a latent image mask pattern 10 of the Japanese character "COPY", the black portion corresponds to the latent image portion LI of the tint block, and the white portion corresponds to the background portion BI of the tint block, for example, as the enlarged view 10X shows. In the camouflage pattern 12, on the other hand, the black portion CAM becomes an area where the dots of the tint block are not formed, and the white portion becomes an area where dots of the tint block are formed, for example, as the enlarged view 12X shows. In other words, the data of the camouflage pattern is binary image data where each pixel indicates a portion to print the tint block image and a portion not to be printed.

FIG. 2 is a diagram depicting an example of an original in which a forgery inhibited tint block is printed. In the tint block 14, a latent image portion LI and a background portion BI are formed based on the latent image mask pattern 10 in FIG. 1. The latent image portion LI is formed by dots with low screen ruling (53 lpi) based on a clustered dot dither method, and the background portion BI is formed of dots with high screen ruling (212 lpi) based on the dispersed dot dither method. As the enlarged tint block 14X shows, the entire tint block has a predetermined output density, but the dots in the latent image portion LI are large dots formed by a screen with low screen ruling, and the dots in the background portion BI are small dots formed by a screen with high screen ruling.

In the tint block 16, the latent image portion LI and the background portion BI are formed, excluding a black area CAM of the camouflage pattern, based on the latent image mask pattern 10 and the camouflage pattern 12 in FIG. 1. As the enlarged tint block 16X shows, the entire tint block has a predetermined output density, where dots are not formed in the area CAM of the camouflage pattern, and in another area, the latent image portion LI formed by large dots and the background portion BI formed by micro dots are formed just like FIG. 1. Since the contrast of the camouflage pattern is high, the latent image (the Japanese character "COPY"), comprised of the latent image portion LI and the background portion BI, of which contrast is low, does not stand out.

In the original of the forgery inhibited tint block in FIG. 2, the output density of the latent image portion LI and the background portion BI are the same, whereby the latent image of the Japanese character "COPY" formed by these portions is concealed. This is referred to as the "concealment capability for a latent image in the original is high".

FIG. 3 is a diagram depicting an example of a copy of the forgery inhibited tint block. The copy 18 is created via a scanning step and dot generation step (step of printing the print media based on the scan data generated in the scanning step) by copying, and as the enlarged view 18X shows, large dots in the latent image portion LI are hardly lost, but many micro dots in the background portion BI are lost. As a result, in the copy 18, the copy output density of the latent image LI hardly drop, but the copy output density of the background portion BI drop considerably, and the latent image of the Japanese character "COPY" emerges. In other words, the latent image of the copy is more easily identified.

The copy 20 is the same as the copy 18, except for the area CAM of the camouflage pattern. The contrast of the camouflage pattern drops because of the drop in the output density of the background portion BI, and the latent image COPY emerges.

SUMMARY OF THE INVENTION

As mentioned above, increasing the concealment capability for the latent image in the original and increasing the identification capability for the latent image in the copy are demanded for a forgery inhibited tint block. However, if the latent image portion of the tint block is formed by dots with low screen ruling using a clustered dot screen and the background portion is formed by dots with high screen ruling using a dispersed dot screen, as in the case of prior art, a high concealment capability for the latent image in the original and a high identification capability for the latent image in the copy cannot be implemented.

Firstly, in order to increase the identification capability for the latent image in the copy so as to increase the copy inhibit effect, it is desirable to increase the output density of the latent image portion. This is because the identification capability for the latent image increases if the output density of the latent image portion which emerges in the copy increases, as shown in FIG. 3, and the copy inhibition effect increases.

However if the output density is increased by increasing the size of the large dots in the latent image portion, the output density of the background portion must also be increased in order to maintain the concealment capability for the latent image in the original. This is because the concealment capability for the latent image in the original is increased by making the output density of the latent image portion and the output density of the background portion the same or similar.

However an attempt to implement the concealment capability for the latent image in the original by increasing the density of the micro dots by increasing the screen ruling of the background portion, so that the output density thereof becomes similar to that of the latent image portion, does not work due to the following reasons. The background portion having high screen ruling sensitively responds to the characteristics of the printer engine, so that a density unevenness in the background portion appears very much, but the latent image portion with low screen ruling is not influenced very much by the characteristics of the printer engine, so the density unevenness is hardly generated.

FIG. 4 shows an original where a tint block, which has a density unevenness in the background portion, is printed, and an original where a tint block, which has a difference in hue and saturation between the background portion and the latent image portion, is printed. In FIG. 4, the tint block 22 has an area where the latent image stands out, and an area where the latent image does not stand out, because of the density unevenness generated in the background portion. The tint block 22E is the tint block 22 which is artificially enhanced.

In the case of the forgery inhibited tint block, formed by high brightness color toner, such as cyan or magenta, the difference in hue and saturation between the latent image portion and the background portion further increases because of the large difference in screen rulings, and the latent image tends to stand out throughout the tint block. The tint block 24 in FIG. 4 is an example when the difference in hue and saturation increased, and the latent image stands out. The tint block 24E is the tint block 24 which is artificially enhanced. Since the difference in hue and saturation between the background portion and the latent image portion increased, the latent image of the Japanese characters "COPIED" stands out.

Therefore the first problem is that an attempt to increase the output density by increasing the screen ruling of the background portion formed by micro dots does not work, and rather diminishes the concealment capability for the latent image in the original, because of the high screen ruling of the background portion, and because of the major difference of the screen ruling between the latent image portion and the background portion.

Secondly, since the background portion is comprised of micro dots of which screen ruling is high, and the latent image portion is comprised of large dots of which screen ruling is low, therefore a high density area where the micro dots and the large dots are combined and larger dots are formed as a result, and a low density area where the spaces between the micro dots and the large dots are wide and dot density is decreased, coexist in the boundary area of the background portion and the latent image portion. For example, as the enlarged tint blocks 14x and 16x in FIG. 2 show, the high density area 26 where large dots of the latent image portion LI and the micro dots of the background portion BI are combined and larger dots are formed as a result, and the low density area 27 where the dot density dropped, coexist in the boundary of the background portion BI and the latent image portion LI.

These areas 26 and 27 diminish the concealment capability for the tint block in the original.

[0092] to [0099] of Japanese Patent Application Laid-Open No. 2005-151456 states that combining of dots is prevented by performing boundary processing to shift the dither matrix at the boundary portions.

FIG. 5 shows the tint block where the boundary processing according to Japanese Patent Application Laid-Open No. 2005-151456 has been performed. In FIG. 5, the original 14 of the tint block, a partially enlarged view thereof 14x, the copy thereof 18 and the partially enlarged view thereof 18x are shown. The boundary processing of Japanese Patent Application Laid-Open No. 2005-151456 is effective to prevent combining of dots at the boundary area of the background portion BI and the latent image portion LI, but the low density area 27, where the dot density is low, is still generated. Therefore the drop of concealment capability for the latent image in the original cannot be solved sufficiently.

With the foregoing in view, it is an object of the present invention to provide a method and device to generate tint block images to be printed on an original, which can increase the identification capability for the latent image in a copy by increasing the output density, while maintaining the concealment capability for the latent image in an original.

According to the first aspect of the invention, a computer readable storage medium that stores a tint block image generation program for generating tint block image data for forming, on a print medium, a tint block image including a latent image portion which is reproduced by copying, and a background portion of which copy output density drops, causes a computer to execute: a latent image portion generation step of generating data of a plurality of first dots in the latent image portion based on a dot clustered screen; and a background portion generation step of generating data of a plurality of second dots and data of a plurality of third dots dispersed among the second dots and having a size smaller than the second dots. And the first dots in the latent image portion and the second dots in the background portion are arranged at positions on common displacement vectors in an area of the tint block image.

In the first aspect, it is preferable that the plurality of third dots in the background portion are dispersed at fixed positions among the plurality of second dots.

In the first aspect, it is preferable that in the background portion generation step, the data of the plurality of second dots having the screen ruling selected in the density setting step is generated, and in the latent image portion generation step, the data of the plurality of first dots having the screen ruling selected in the density setting step and having a size corresponding to the output density on the print medium of the background portion, is generated.

In the first aspect, it is preferable that in the latent image portion generation step, the data of the plurality of first dots is generated, based on an input grayscale value, by referring to a latent image portion dither matrix in which a low threshold to a high threshold are arranged such that the dots can be clustered, in the background portion generation step, the data of the plurality of second and third dots is generated, based on the input grayscale value, by referring to a background portion dither matrix in which a minimum threshold is arranged at positions where the second and third dots are formed. The tint block image generation program further causes the computer to execute a density setting step of, in response to a density setting input for a tint block image, selecting a screen ruling corresponding to the density setting input, in the background portion generation step, the background portion dither matrix for providing the screen ruling selected in the density setting step to the plurality of second dots, is selected and referred to, and in the latent image portion generation step, the latent image portion dither matrix for providing the screen ruling selected in the density setting step to the plurality of first dots is selected and referred to, and the input grayscale value is further selected according to the output density on the print medium of the background portion.

According to the second aspect of the invention, a computer readable storage medium that stores a tint block image generation program for generating tint block image data for forming, on a print medium, a tint block image including a latent image portion which is reproduced by copying, and a background portion of which copy output density drops, causes a computer to execute: a latent image portion generation step of generating data of a plurality of first dots having a first size in the latent image portion; and a background portion generation step of generating, in the background portion, data of a plurality of second dots having a second size, which is smaller than the first size, and data of a plurality of third dots dispersed among the second dots and having a third size, which is smaller than the second size. And spatial frequency and phase of centers of the first dots in the latent image portion match spatial frequency and phase of centers of the second dots in the background portion.

Further, a tint block image generation device and a method thereof for executing the above program of the first and second aspect are provided.

BRIEF DESCRIPTION OF THE DRAWINGS

FIG. 8 shows an example of a latent image portion dither matrix 33 and a background portion dither matrix 34;

FIG. 10 shows an example of the latent image dither matrix 33-1 and the first dot D1 in the latent image portion LI generated thereby;

FIG. 13 shows an example of a tint block arrangement;

FIGS. 15A to 15D are diagrams depicting the tint block image generation processing in FIG. 11;

FIG. 16 shows an original and a copy of a tint block image according to an example;

FIG. 17 is an enlarged view of the original and the copy of the tint block image in FIG. 16;

FIG. 18 shows an original and a copy of a tint block image according to an example;

DESCRIPTION OF THE PREFERRED EMBODIMENTS

Embodiments of the present invention will now be described with reference to the drawings. The technical scope of the present invention, however, shall not be limited to these embodiments, but extend to matters stated in the Claims and equivalents thereof.

Figure 6:
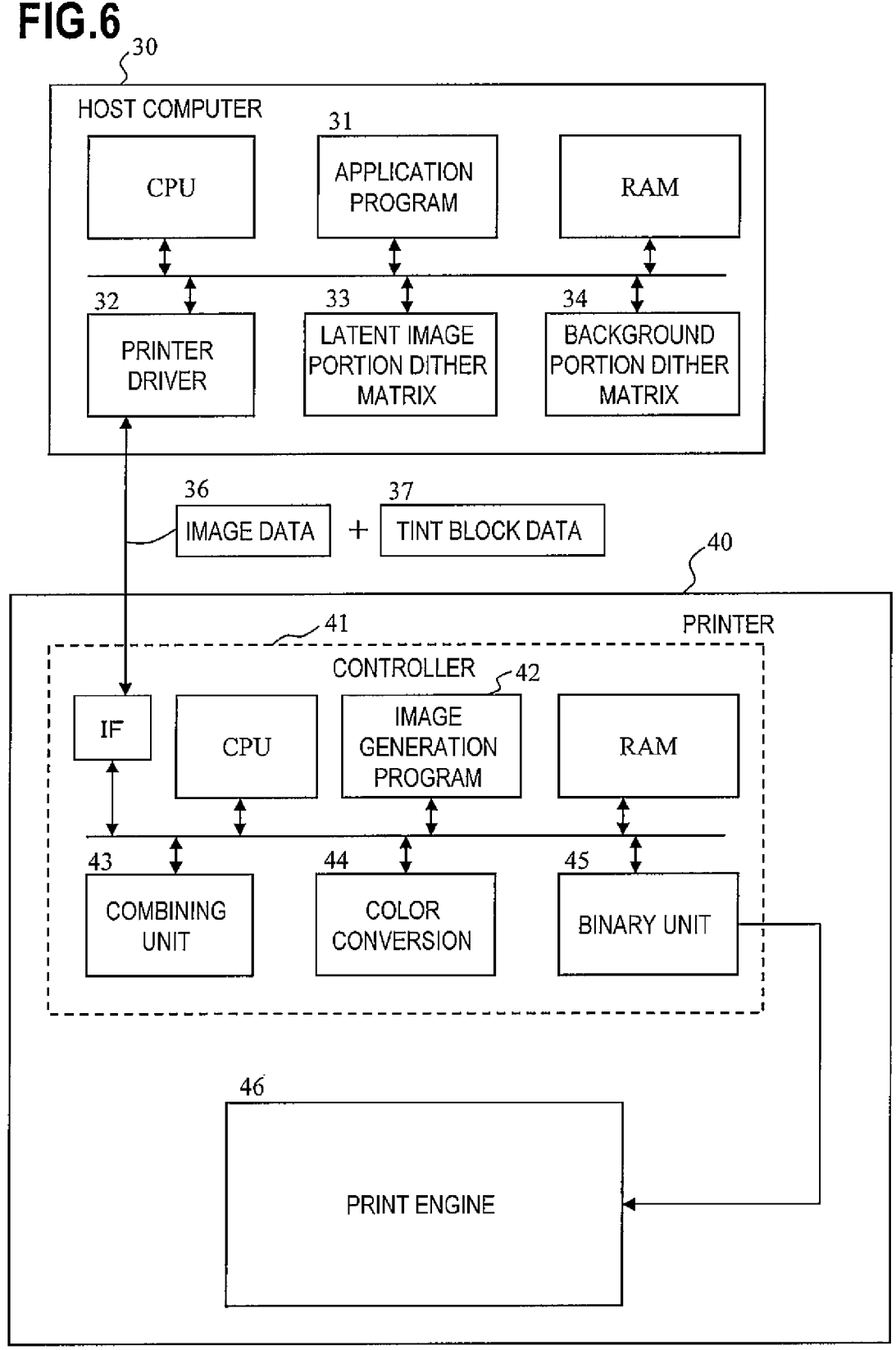
FIG. 6 is a diagram depicting a configuration of a tint block image generation device according to the present embodiment.

FIG. 6 is a diagram depicting a configuration of a tint block image generation device according to the present embodiment. The tint block image generation device comprises a printer driver program 32 which are installed in a host computer 30, a latent image portion dither matrix 33, a background portion dither matrix 34, both of which are stored in the host computer 30, and a printer 40. The latent image portion dither matrix 33 and the background dither matrix 34 are included in a printer driver program 32, which the printer manufacturer distributes to users via a recording media or via such a network as the Internet, and are stored in a recording media in the host computer when the printer driver program 32 is installed in the host computer. The host computer 30 further comprises a CPU, a RAM and an application program 31, and generates image data comprised of text, images and graphics, by executing the application program 31. The host computer 30 also generates tint block data 37 using the printer driver 32. When a print request is received from the user for the image data generated by the application 31, the printer driver generates a print job of the printing target image data 36 based on a printer control language which the printer device 40 can interpret. If the print request from the user includes a request to add the tint block data to the printing target image data 36, then the printer driver 32 generates the tint block data, includes the tint block data 37 in the print job, and sends this data to the interface IF of the printer 40.

The image data 36 could take various forms, such as data described by a page description language, data developed into intermediate code of a printer, and RGB bit map data developed into pixels (data of which grayscale value is 0 to 255). The tint block data 37 is also 1-bit data to indicate the ON/OFF of dots in each pixel, or 8-bit data of dot ON (grayscale value 0) and dot OFF (grayscale value 255) corresponding to the grayscale value data of the image data 36.

The printer 40, on the other hand, comprises a print engine 46, which comprises a print medium providing unit, a print execution unit for generating an image on a print medium, and a print medium discharge unit, and a controller 41 for performing a predetermined image processing on a received image data 36 and tint block data 37, and controlling the print engine 42. A CPU of the controller 41 executes an image generation program 42 and generates bit map data by developing the received image data 36 into pixels. If the received image data 36 is already in bit map data format, this bit map data can be directly used.

A combining unit 43 combines bit map data which has a grayscale value for each pixel of the image data 36, and dot data of the tint block data 37. The combining process is for example, a process of overwriting the image data 36 to the tint block data 37, or a process of blending the image data 36 and the tint block data 37 according to a predetermined algorism. A color conversion unit 44 converts the color of combined RGB data into CMYK data, a binary unit 45 converts the CMYK bit map data into a data of dots in a pixel using a predetermined screen, and outputs the result to the print engine 46. As a result, the print engine 46 prints a combined image of the image generated by the application program and the tint block image on the print media. This is the original.

According to another combining method, the color of ROB bit map data of the image data 36 is converted into CMYK bit map data, and the tint block data 37 is combined with a bit map data having any one color of CMYK. In this case, the dot ON/OFF information for each pixel of the tint block data 37 is used as the maximum grayscale value/minimum grayscale value of the bit map data, and this bit map data of any one color of CMYK of the image data 36 is overwritten by this tint block 37. For example, if the image data 36 is text data of black K, the bit map data of any one color of CMY is converted into tint block data 37. Or the pixels of which grayscale value is the minimum density of the bit map data of any one color of the image data 36 is overwritten by the tint block data 37.

In the embodiment in FIG. 6, the printer driver 32 of the host computer 30 corresponds to the tint block image generation program, and generates the tint block data 37. Alternatively, the tint block image may be generated in the printer, and the tint block image may be generated based on this data. In this case, the printer driver 32 generates a print job data, including the specifications of combining the tint block image with the print target image data 36, and specifying the printing, the print job data including information required for generating the tint block data, such as the specifications for text and pattern which will be lost or will be reproduced during copying (for example a text of tint block, a size thereof and a tint block effect), specifications of the density of the tint block, and specifications on the addition of camouflage and the controller 41 of the printer 40 executes the tint block image generation program, and generates the tint block data from the job data in which generating the tint block is instructed, using the latent image portion dither matrix and the background portion dither matrix stored in the printer 40. In this case, the controller 41 has the dither matrix of the latent image portion and the background portion, and the image generation program 42 has a function of generating the tint bock data. The tint block generation processing in the printer 40 may be performed by the CPU of the printer executing an image generation program, or by being executed in such a dedicated image processing generation device that is ASIC-based.

Now the tint block image generation method by the tint block image generation device (host computer, in the case of the tint block image being generated by the printer driver 32, and the printer 40, in the case of the tint block image being generated by the image generation program) will be described. In the present embodiment, the tint block image generation device generates tint block image data comprised of a latent image portion and a background portion, corresponding to a latent image mask pattern which the user selected from default patterns, or a latent image mask pattern which the tint block generation device generated according to the specifications, including text and character size, by the user.

The tint block image data of the latent image portion has data of first dots based on the latent image portion dither matrix 33, and when this tint block image data is printed, an image with a predetermined output density is generated in the latent image portion. The tint block image data of the background portion has data of a plurality of second dots and third dots based on the background portion dither matrix 34, and when this tint block image data is printed, an image with a predetermined output density is generated in the background portion.

Figure 7:
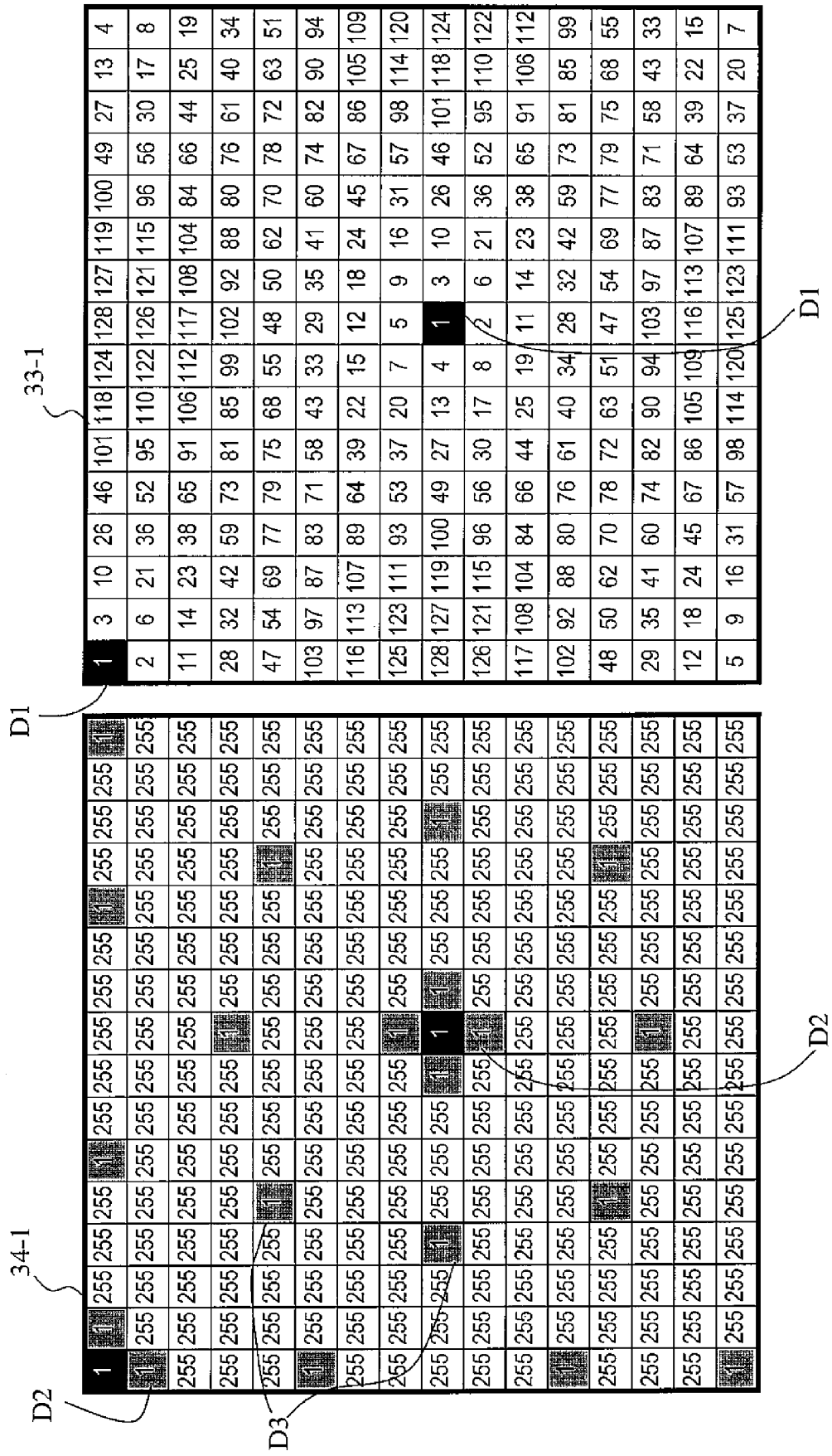
FIG. 7 shows an example of a latent image portion dither matrix 33 and a background portion dither matrix 34.
Figure 8:
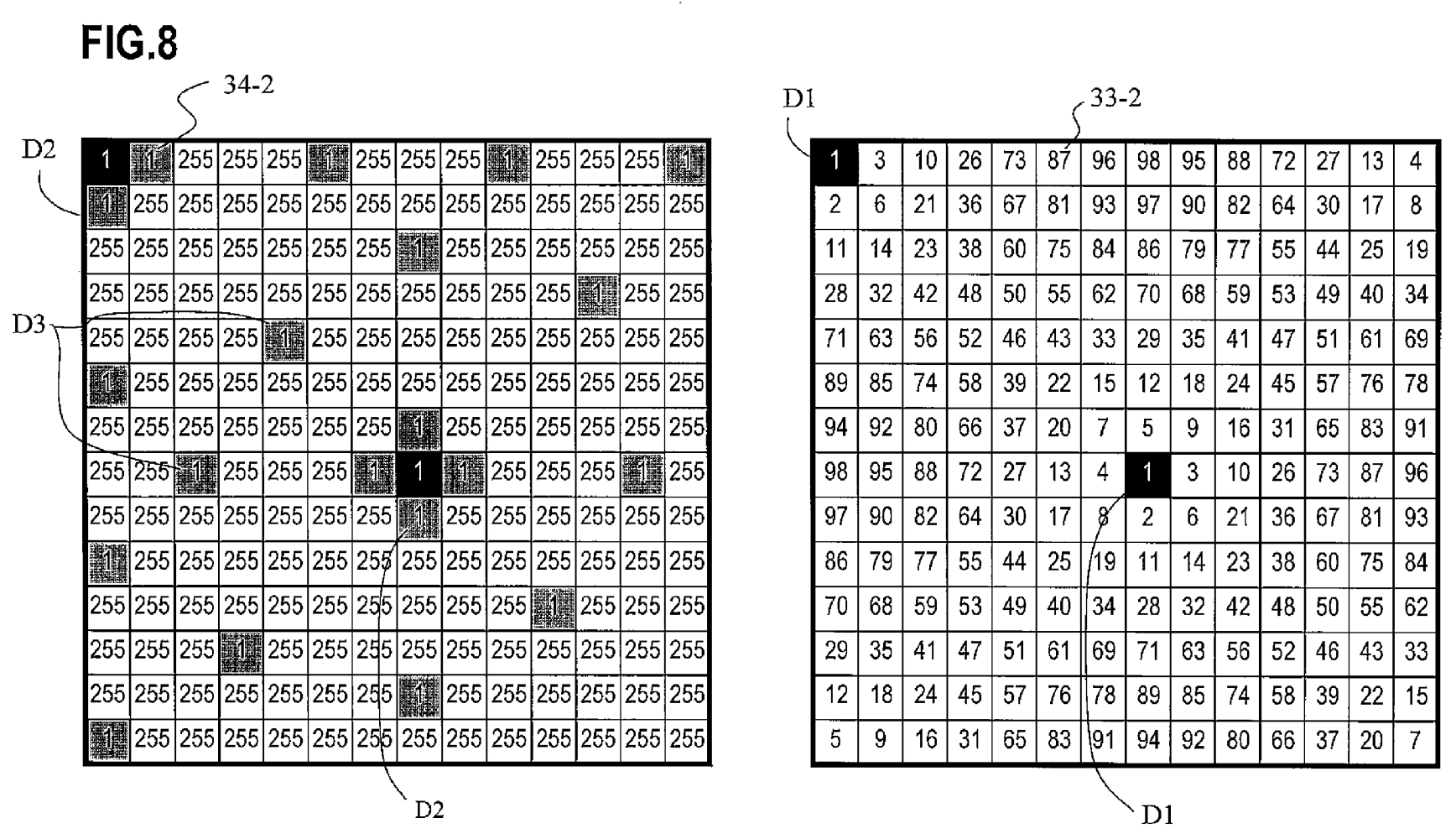
Figure 9:
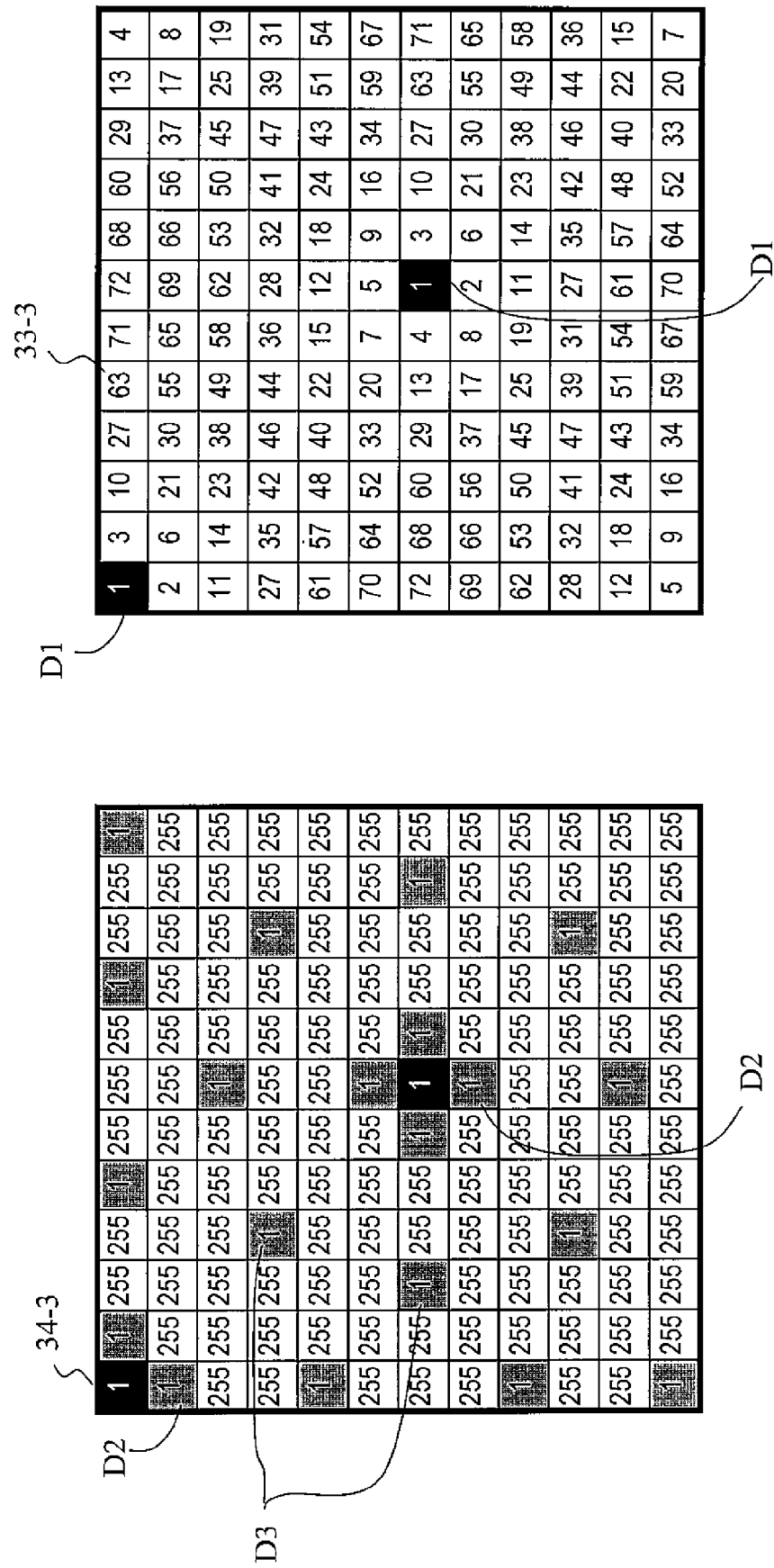
FIG. 9 shows an example of a latent image portion dither matrix 33 and a background portion dither matrix 34.

FIG. 7, FIG. 8 and FIG. 9 show three examples of a latent image portion dither matrix 33 and a background portion dither matrix 34. In these examples, the latent image portion dither matrix 33-1, 33-2 or 33-3 is a dot cluster dither matrix, and the background portion dither matrix 34-1, 34-2 or 34-3 is a dither matrix for generating dispersingly fixed sized second dots D2 and third dots D3 into fixed positions. The dither matrix in FIG. 7 is used to generate the output density of the tint block to be "low", the dither matrix in FIG. 8 is used to generate the output density of the tint block to be "normal", and the dither matrix in FIG. 9 is used to generate the output density of the tint block to be "high".

The latent image portion dither matrix 33-1 in FIG. 7 is a dot clustered dither matrix of which screen ruling is 53 lpi, and is a threshold matrix of which size is 16×16, where the thresholds 1 to 128 are arranged in each cell. A pixel having the threshold 1, corresponding to the center of a half tone dot, which is the first dot D1, is arranged at the positions of the two displacement vectors (8, 8) and (−8, 8). The area of a parallelogram determined by an inner product of the two displacement vectors is 128, and the threshold is 1 to 128 for 128 levels. The pixel having the threshold "1" is the center of the first dot (half tone dot) D1, and the area of the first dot D1 gradually increases from the center of the half tone dot, as the input grayscale value increases from 0 to 128.

Figure 10:
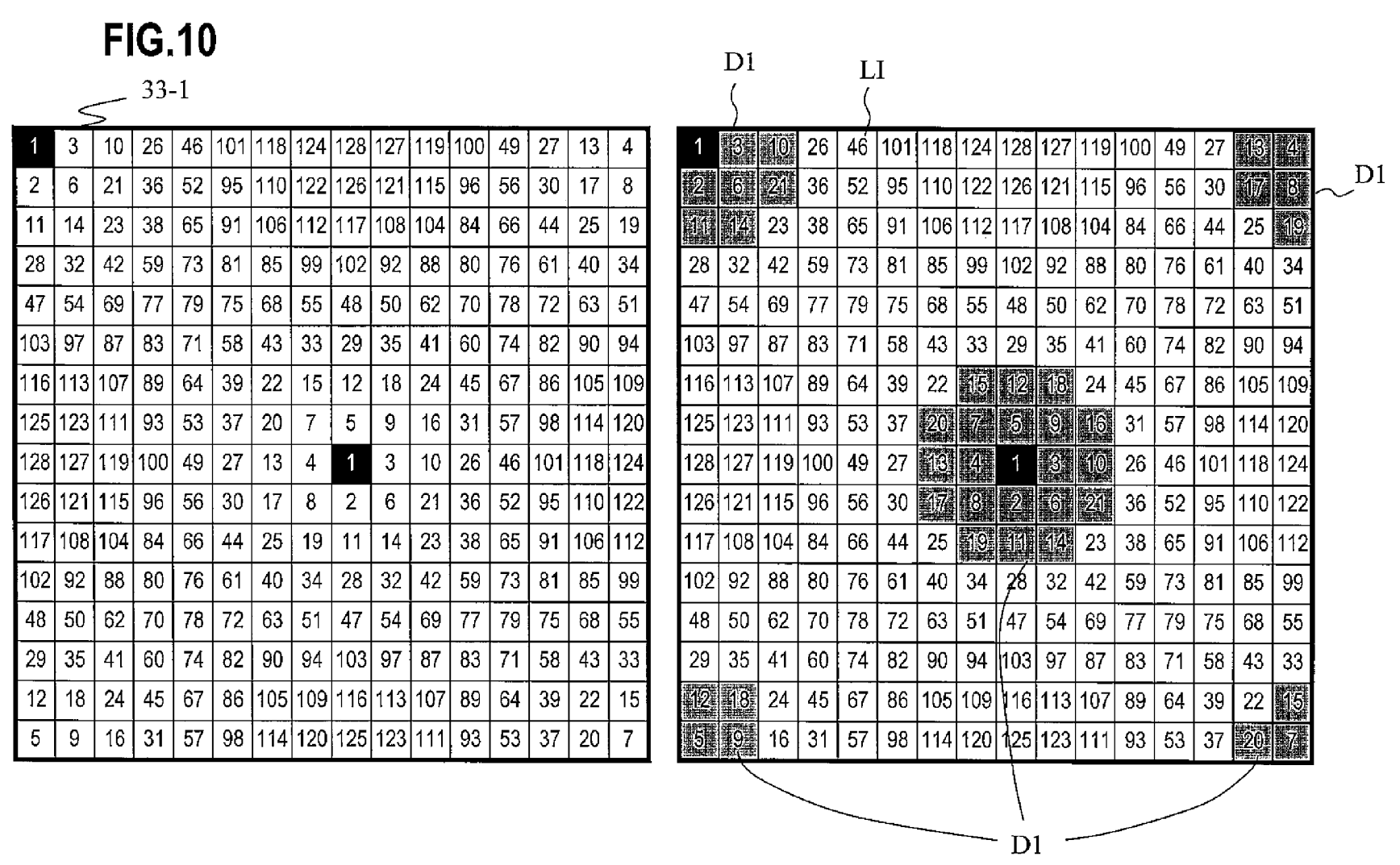

FIG. 10 shows the latent image portion dither matrix 33-1 and an example of the first dot D1 of the latent image portion LI generated thereby. The latent image portion dither matrix 33-1 in FIG. 10 is the same as that in FIG. 7. The first dot D1 of the latent image portion LI is an example when the input grayscale value is "21". The printer driver 32 compares the input grayscale value "21" of all the pixels in the latent image portion with the threshold value of each cell of the latent image portion dither matrix 33-1, and converts the data of a pixel of which input grayscale value is equal to or greater than the threshold into dot ON. A pixel dot is generated in a pixel of a dot ON. The data of a pixel of which input grayscale value is smaller than the threshold, on the other hand, is converted into dot OFF. A pixel dot is not generated in a pixel of dot OFF.

As a result, the first dot D1 becomes a half tone dot comprised of 21 pixel dots centering around the pixel of which threshold is "1". The center of the first dot D1 is fixed to a position on the displacement vectors (8, 8) and (−8, 8). When the latent image portion LI comprised of a plurality of first dots D1 is printed, the output density of the latent image portion LI depends on the dot size of the first dots D1 which correspond to the input grayscale value.

In the present description, a pixel dot is comprised of a dot of one pixel, and a cluster of a plurality of pixel dots constitutes a half tone dot. In other words, the first dot D1 is a half tone dot comprised of a cluster of a plurality of pixel dots. As mentioned later, the second dot is also a half tone dot comprised of a cluster of a plurality of (5) pixel dots, and the third dot is comprised of one pixel dot.

The background portion dither matrix 34-1 in FIG. 7 is a threshold matrix of which size is 16×16, where threshold "1" or "255" is arranged in each cell. According to this background portion dither matrix 34-1, if it is assumed that the input grayscale value is one of 1 to 254, a pixel dot is formed in a cell of which threshold is "1", and a pixel dot is not formed in a cell of which threshold is "255". Five pixels having the threshold "1" are arranged in a cross shape adjacent to each other at a position where the second dot D2 is generated, and one pixel having threshold "1" is isolated and arranged at a position where the third dot D3 is generated. The pixel having threshold "1" corresponding to the center of the half tone dot of the second dot D2 is arranged at a position on the two displacement vectors (8, 8) and (−8, 8), and the pixel having the threshold "1" at a position where the third dot D3 is formed is arranged at the mid-positions of the adjacent second dots D2 and the dispersed positions at the top, bottom, left and right of the second dots D2.

Therefore according to the background portion dither matrix 34-1 in FIG. 7, an image, where the second dot D2 comprised of five pixel dots and the micro third dot D3 comprised of one pixel dot are dispersed and arranged at fixed positions, is generated in the background portion. If the input grayscale value is in a 1 to 254 range, the same image comprised of the second dots D2 and the third dots D3 is generated. The center of the second dot D2 is arranged at a position on the displacement vectors (8, 8) and (−8, 8), and the screen ruling of the second dots D2 is 53 lpi, which is the same as the screen ruling of the first dots D1.

The tint block image of the latent image portion and the background portion, generated by the latent image portion dither matrix 33-1 and the background portion dither matrix 34-1 shown in FIG. 7 is as follows. In the background portion the second dots D2, each of which is comprised of five pixel dots, arranged on the displacement vectors (8, 8) and (−8, 8), and the third dots D3, each of which is comprised of one pixel dot, dispersed and arranged distant from the second dots, are generated. In the latent image portion, on the other hand, first dots D1 arranged on the displacement vectors (8, 8) and (−8, 8) are generated, and the size of the first dot D1 is set to a size (21 pixel dots) with which output density, when the latent image portion is printed, can reproduce the same output density as the output density when the background portion is printed. In other words, the latent image portion has first dots D1 generated based on the dot clustered dither matrix 33-1, but the input grayscale values are set corresponding to the output density of the background portion, so the size of the first dots D1 also become a size corresponding to the output density of the background portion.

If the third dots D3, which are micro dots in the background portion, are ignored, the first dots D1 in the latent image portion and the second dots D2 in the background portion, which are arranged on the common displacement vectors (8, 8) and (−8, 8), have the same screen ruling of 53 lpi.

FIG. 8 shows the background portion dither matrix 34-2 and the latent image portion dither matrix 33-2, of which matrix size is 14×14. According to these dither matrices, the centers of the second dots D2 and the first dots D1 are arranged at positions on the common displacement vectors (7, 7) and (−7, 7), and the screen rulings thereof are both 61 lpi.

FIG. 9 shows the background portion dither matrix 34-3 and the latent image portion dither matrix 33-3, of which matrix size is 12×12. According to these dither matrices, the centers of the second dots D2 and the first dots D1 are arranged at positions on the common displacement vectors (6, 6) and (−6, 6), and the screen rulings thereof are both 71 lpi.

FIG. 16 shows the original 14 of the tint block, the partially enlarged view thereof 14X, the copy thereof 18, and the partially enlarged view thereof 18X according to the later mentioned embodiment. FIG. 17 shows partially enlarged views 14X and 18X when the enlarged views in FIG. 16 are further enlarged. The original 14 or 14X of this tint block is an example when the tint block image data generated using the dither matrix in FIG. 7 is printed.

In the partially enlarged view 14X of the original 14 of the tint block shown in FIG. 17, dots of the latent image portion LI and the background portion BI, constituting the tint block image, are shown. As FIG. 17 shows, the latent image portion LI of the partially enlarged view 14X of the original is comprised of first dots D1, of which size is relatively large, so in the copy 18X which is reproduced by copying the original, the pixel dots constituting the first dot D1 of the latent image portion LI, are reproduced with little pixel dot loss. As a result, the output density of the latent image portion LI hardly drops.

On the other hand, the background portion BI of the partially enlarged view 14X of the original tint block has a plurality of second dots D2 and micro third dots D3, which are dispersed at fixed positions among the second dots D2, which are printed. As mentioned above, the second dot D2 is comprised of five adjacent pixel dots arranged in a cross shape, and has a screen ruling of 53 lpi, which is the same as the first dots D1 in the latent image portion. The third dot D3 is a micro dot, comprised of a single pixel dot, and is dispersed at positions where the distances from the second dots D2 are roughly the same, that is at positions where the positional relationships with D2 are stable.

As a result, in the copy 18X, many micro dots, that is the third dots D3, in the background portion BI are lost. Because of this, the output density of the background portion BI drops considerably, and a latent image emerges because of the contrast with the high output density of the latent image portion LI.

In the background portion BI, it is sufficient some degree of a density drop can occur when an original is copied, and all of the plurality of dots constituting the background portion BI need not disappear. Therefore the background portion BI has third dots D3 which has micro sizes which can disappear easily during copying, in addition to the second dots D2 of which size is relatively large enough not to disappear during copying. Hence when an original is copied, the third dots D3 disappear and the output density drops in the background portion BI. As a result, a difference in output density is generated between the latent image portion LI and the background portion BI of the copy, and the latent image can emerge.

In the original 14X, the output densities of the latent image portion LI and the background portion BI are set to be equal in order to increase the concealment capability for the latent image. The output density is not simply in proportion to the number of pixel dots per unit area, but also depends on the dot size and dispersion state of the dots. Therefore the input grayscales of the latent image portion dither matrix 33 are selected such that the output density acquired by measuring the printed tint block image with a calorimeter becomes the same between the latent image portion LI and the background portion BI. The input grayscales of the latent image portion dither matrix 33 may be provided without using a calorimeter, such that the output density of the background portion and the output density of the latent image portion become visually the same.

In the present embodiment, the background portion BI is not comprised of micro dots with high screen ruling, as in the case of prior art, but is comprised of large sized second dots D2 having a screen ruling the same as that of the first dots D1 of the latent image portion LI, and of micro sized third dots D3, which are disposed at fixed position among those second dots. By constructing the background portion of the tint block like this, the following merits can be implemented.

Firstly the background portion has large sized second dots D2 and micro sized third dots D3, so the output density of the background portion can be increased without using high screen ruling, as in the case of prior art. Since the micro sized third dots D3 exist, the third dots D3 effectively disappear, and output density drops during copying, hence the identification capability for the latent image of a copy can be kept high. Also the screen ruling of the second dots is low, so the dots dispersed within the range of reproduction capability of the printer engine can be reproduced. Therefore the output density of the original tint block can be increased by increasing the output density of the background portion BI, and therefore the identification capability for the latent image in the copy can be increased.

Secondly the screen ruling of the second dots in the background portion is relatively low, so the influence of the characteristics of the print engine is small, and density unevenness is not generated in the print image of the background portion of the original. Therefore, as 22 in FIG. 4 shows, the latent image does not stand out, and a drop in concealing capability for the latent image in the original can be avoided.

Figure 1:
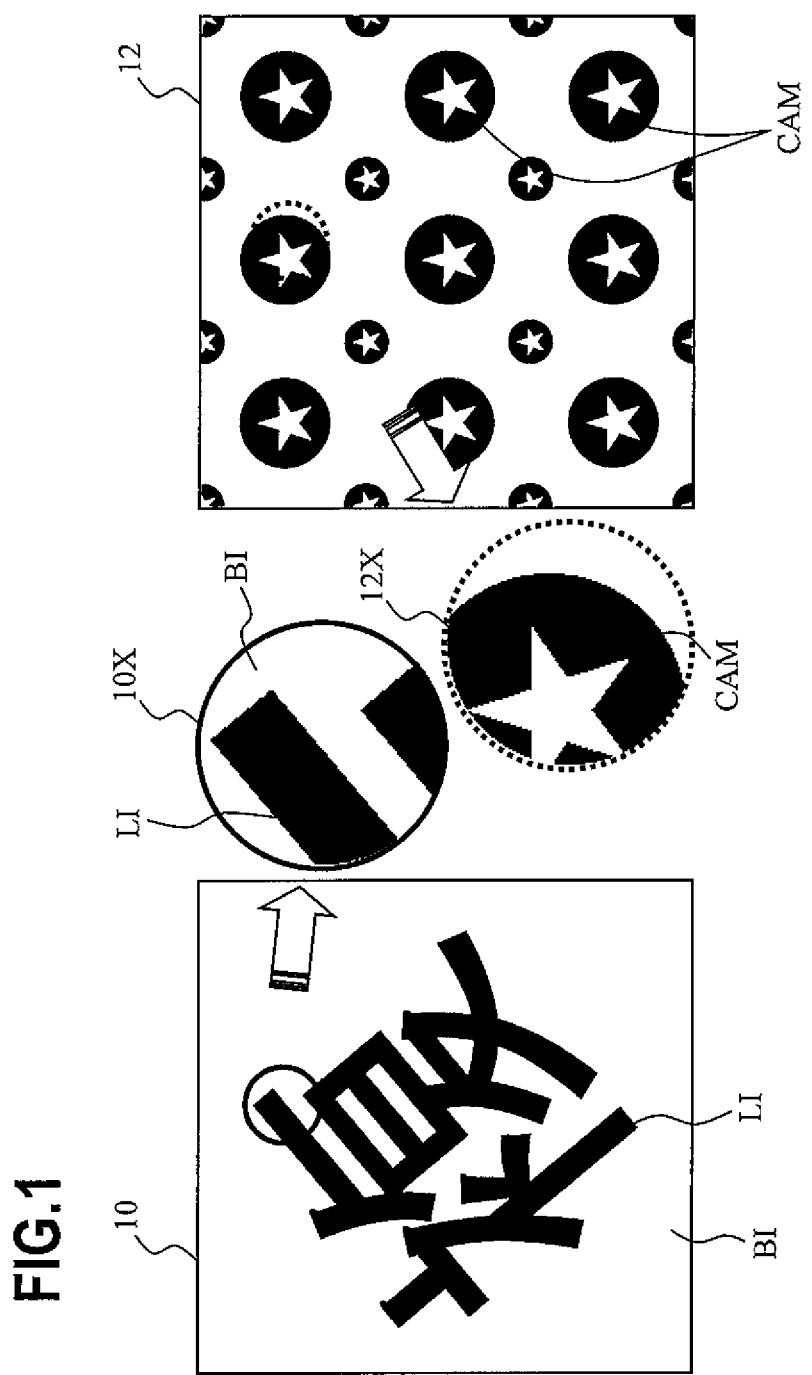
FIG. 1 is a diagram depicting an example of a latent image of a forgery inhibited tint block and a camouflage pattern.
Figure 2:
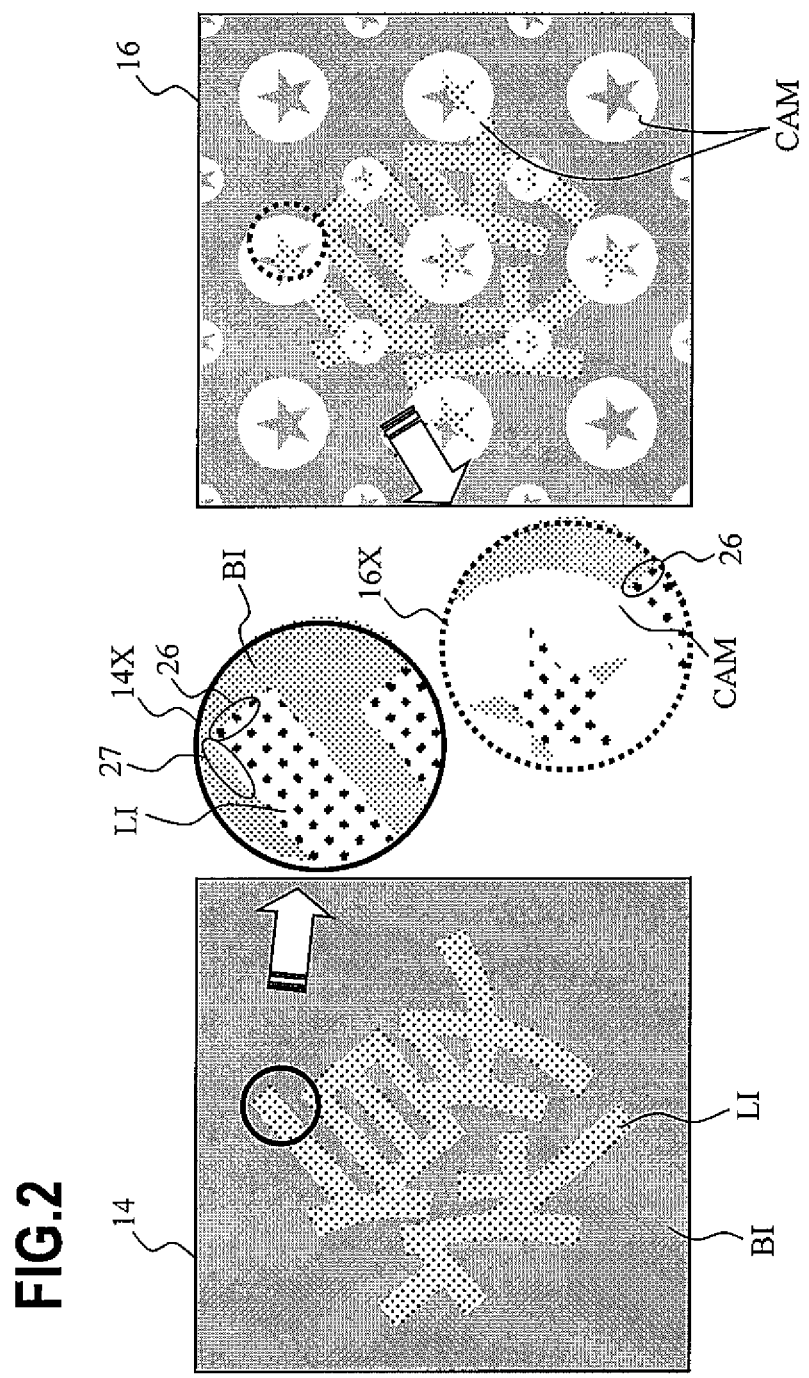
FIG. 2 is a diagram depicting an example of an original of a forgery inhibited tint block.
Figure 3:
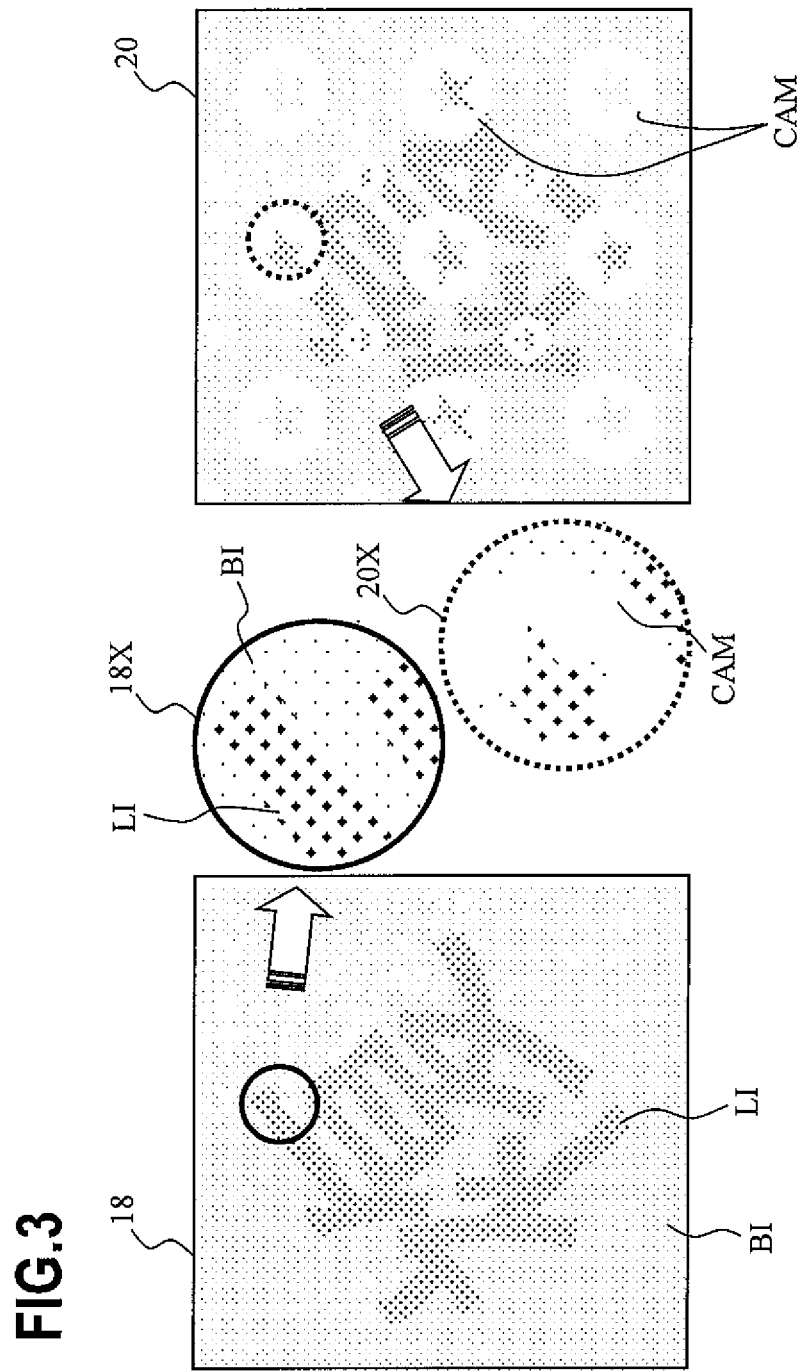
FIG. 3 is a diagram depicting an example of a copy of a forgery inhibited tint block.
Figure 4:
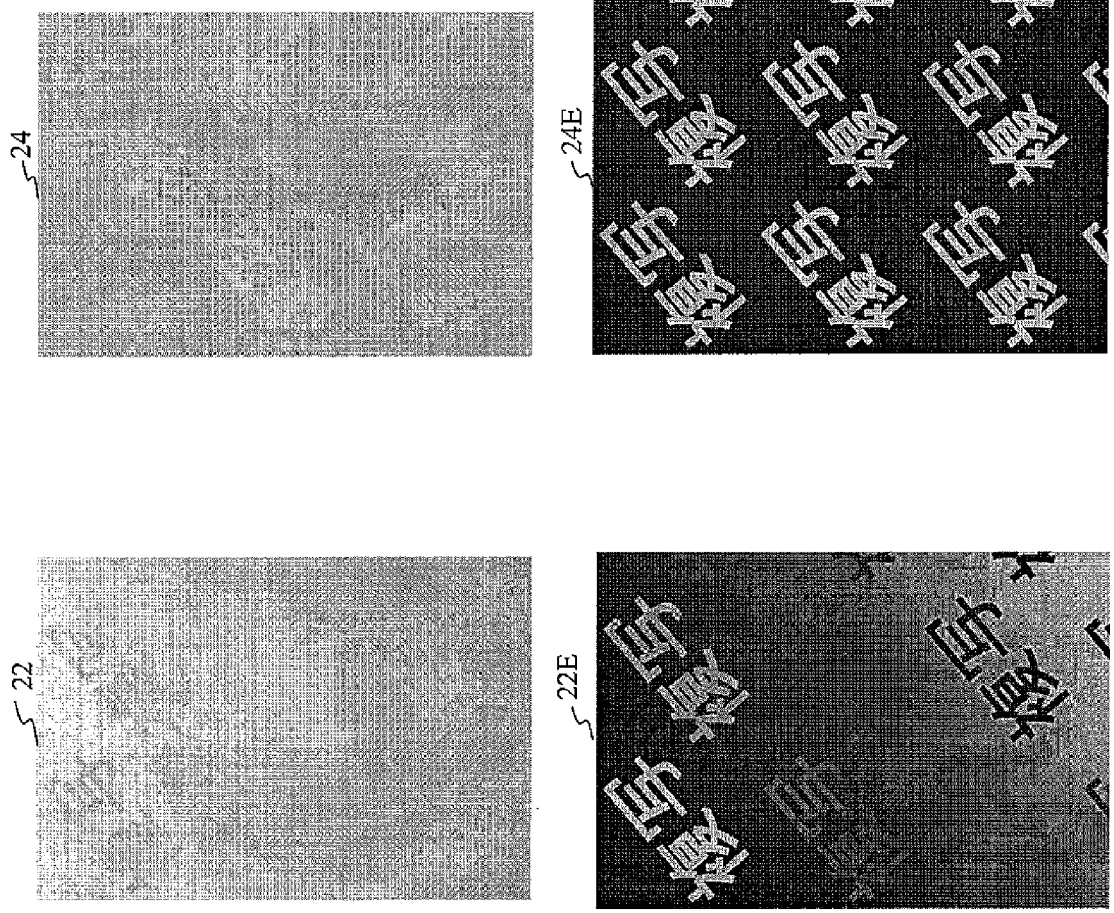
FIG. 4 shows a tint block having a density unevenness in the background portion and a tint block having differences in hue and saturation between the background portion and latent image portion.
Figure 5:
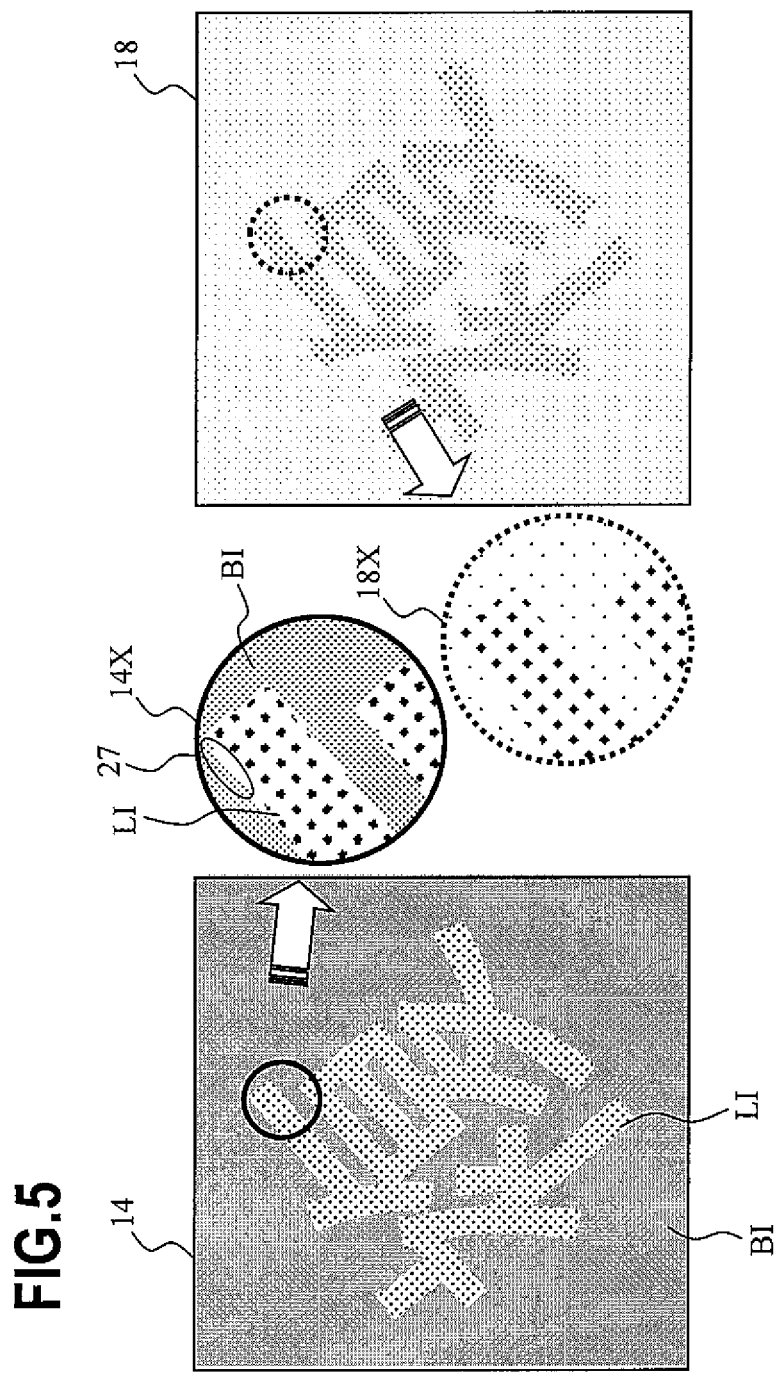
FIG. 5 is a diagram depicting a tint block after the boundary processing according to Japanese Patent Application Laid-Open No. 2005-151456 is performed.

Thirdly, the screen ruling of the second dots in the background portion is the same as the screen ruling of the first dots of the latent image portion, the difference in hue and saturation, due to the difference of screen rulings, as shown in 24 in FIG. 4, does not stand out when the tint block image is generated by such color toner as magenta and cyan, and therefore a drop in concealment capability for the latent image in the original can be avoided.

Fourthly, according to the background portion dither matrix in FIG. 7 to FIG. 9, the background portion is generated without depending on the input grayscale values of the tint block, and the second dots D2 and the third dots D3 are dispersed at fixed positions. To change the output density of the print image of the background portion, the screen ruling of the second dots D2 is changed, as shown in the matrices 34-1, 34-2 and 34-3 in FIG. 7, FIG. 8 and FIG. 9. In other words, the output density is changed, not by changing the half tone dot size, as in the case of a dot clustered screen, but by changing the screen ruling of the large sized second dots D2, while fixing the positional relationships of the second dots D2 and the third dots D3. By this, the image of the background portion BI is always generated with maintaining the relationship where the second dots D2 and the third dots D3 are dispersed.

This means that the dots in the background portion are stably dispersed when the original is printed, and the micro sized third dots D3 disappear with certainty during copying. Therefore the output density of the background portion can be increased while maintaining a high concealment capability for the latent image in the original, and the tint block in the original can be printed at high output density, and the identification capability for the latent image in the copy can be further increased.

Fifthly, according to the present embodiment, the screen ruling of the second dots D2 of the background portion is changed to change the density of the tint block. In other words, one of the plurality of dither matrices having a different screen ruling in FIG. 7, FIG. 8 and FIG. 9 is selected. Then input grayscale values, to be applied to the latent image dither matrices, are selected corresponding to the output density of the print image to be generated by the selected background portion dither matrices. The input grayscale values may be default values selected by the printer manufacturer prior to shipment for each background portion matrix to be provided, or may be updated by the user or service personnel according to the age deterioration of the printer engine characteristics. An image of the latent image portion is comprised of the first dots (half tone dots) D1 having a size corresponding to the input grayscale values based on the selected input grayscale value and the latent image portion dither matrix 33 in FIG. 7, FIG. 8 and FIG. 9.

The latent image portion has the first dots D1 based on the dot clustered screen which has multilevel thresholds, so the first screen ruling is relatively low, allowing many grayscale values. Therefore the output density of the print image of the latent image portion can be closer or can perfectly match the output density of the print image in the background portion, and the concealment capability for the latent image in the original can be further increased.

Sixthly, as a characteristic aspect of the present embodiment, the first dots D1 in the latent image portion LI and the second dots D2 in the background portion BI are arranged on common displacement vectors, and are therefore arranged on the same screen rulings 100 and 102, as shown in FIG. 17. As a result, the first dots D1 and the second dots D2 have the same spatial frequency on the tint block image, and the phases thereof also match. Hence the first dots D1 and the second dots D2 are not arranged at the same or close positions and combined with each other in the boundary area of the latent image portion LI and the background portion BI, like the case of prior art. The third dots D3 are dispersed at stable positions distant from the second dots D2, so if the input grayscale values are less than a predetermined value, the first dots D1 are not arranged at positions the same as or close to the second dots D2. In other words, unlike the case of prior art, large dots are not generated by the first and second dots being combined in the boundary area of the latent image portion LI and the background portion BI, therefore the high density area where the output density of the print image increases is not generated. Also the low density area, where the first and second dots are generated distant from each other and the dot density drops, is not generated in the boundary area of the latent image portion LI and the background portion BI.

According to the dither matrix in FIG. 7, the screen ruling comprised of the first dots D1 and the second dots D2 is 53 lpi, and according to FIG. 8, the screen ruling is 61 lpi, and according to FIG. 9, the screen ruling is 71 lpi. In the present embodiment, the background portion and the latent image portion dither matrix pairs in FIG. 7, FIG. 8 and FIG. 9 are used respectively when the output density of the tint block image is set to be "low", 'normal' or "high". In other words, as the density of the tint block image increases, a dither matrix having a higher screen ruling is selected. By this, the densities of the second and third dots sequentially become higher in the background portion. In the case of the dither matrix in FIG. 7, the input grayscale value is set to "12", in the case of the dither matrix in FIG. 8, the input grayscale value is set to "8" and in the case of the dither matrix in FIG. 9, the input grayscale value is set to "9" respectively. In the latent image portion, the first half tone dots D1 having a size corresponding to the input grayscale value are generated. In other words, the output density is controlled by the screen ruling of the dots or the density of the dots in the background portion, and by the size of the dots in the latent image portion.

In this way, even if the output density of the tint block image is changed, the positions of the first and second dots of the latent image portion and the background portion are positions on common displacement vectors, and do not influence each other, and combining of the first and second dots or unnecessary separation thereof in the boundary area does not occur. Also in the background portion BI, the second dots D2 and the third dots D3 are always arranged at distant positions, so generation of the second and third dots D2 and D3 is stabilized in the original, and disappearance of the third dots D3 during copying is also stabilized.

Figure 11:
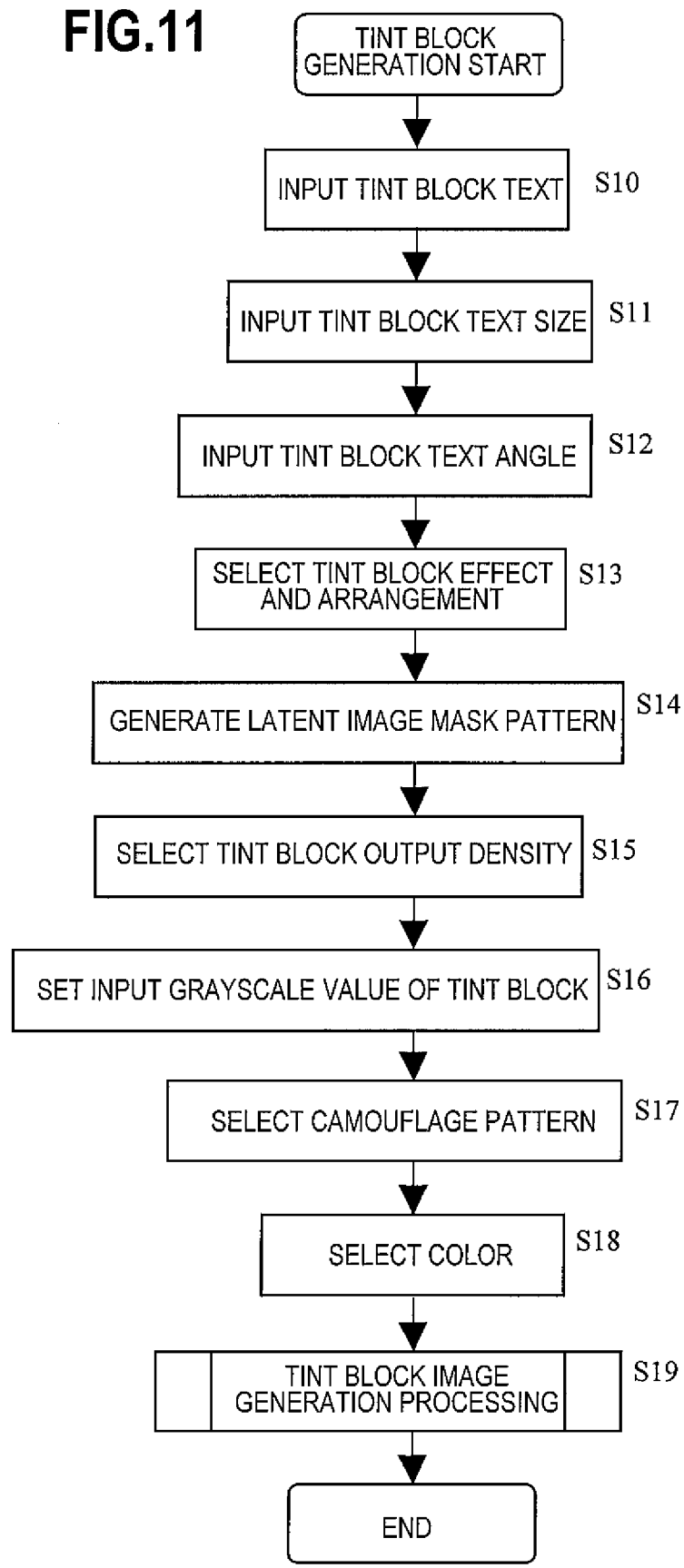
FIG. 11 is a flow chart depicting a tint block generation method according to the present embodiment.

FIG. 11 is a flow chart depicting the tint block generation method according to the present embodiment. In the printer driver 32 of the host computer 30, the printer user selects the tint block generation menu. The printer driver program 32 executes the generation of tint block image data according to the flow chart in FIG. 11. First the printer driver program provides a user interface to the user for setting the tint block printing. The printer driver input the text of the tint block by the user via this user interface, and acquires the tint block text (S10). For example, the text is "COPIED", 'DUPLICATE' or "confidential", and this text becomes the latent image of the tint block. Also corresponding the size of the tint block text, such as 48 point, the angle of the tint block text, and the arrangement of the tint block effect, which are input by the user, the printer driver acquires the size of the tint block text, the tint block angle, the tint block effect and the arrangement (S11), (S12) and (S13). The tint block effect is whether the text is void (text is white and the surrounding is black in the tint block mask pattern) or embossed (text is black and the surrounding is white in the tint block mask pattern). In the case of void, the text becomes the background portion and the surrounding becomes the latent image portion, and in the case of embossed, the text becomes the latent image portion and the surrounding becomes the background portion. The arrangement of the tint block is square, oblique and inverted, for example.

Figure 12:
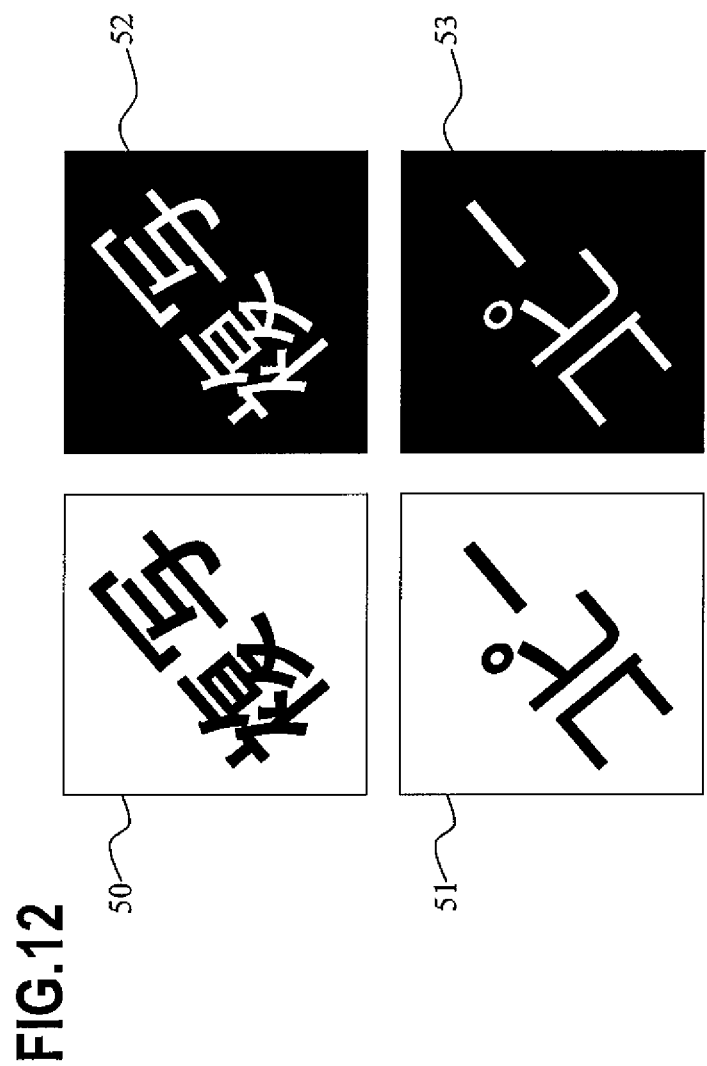
FIG. 12 shows an example of the tint block effect.

FIG. 12 shows an example of the tint block effect. The tint block patterns 50 and 51 are the text COPIED and DUPLICATE, the text is embossed in the original or in the copy thereof. The tint block patterns 52 and 53 are the same above text, but are examples of the tint block effect when the text is void in the original or in the copy. In both cases, the angle of the text is set to 40 degrees.

FIG. 13 shows examples of the arrangement of a tint block. In all these cases, the text is COPIED, the angle is 40 degrees, and the tint block effect is embossed. In the case of (a) square arrangement, the tint block image is generated so that the latent image mask pattern is attached like a tile. In the case of (b), an oblique arrangement, the latent image mask pattern is shifted by a predetermined phase at every line feed. And in the case of (c), an inverted arrangement, the latent image mask pattern is vertically inverted at every line feed.

When the user finishes input or selection in steps S10 to S13, the printer driver 32 generates a latent image mask pattern (S14). An example of the latent image mask pattern is shown in FIG. 12.

The user actually prints the tint block and copies it or confirms that it is appropriate on a preview screen, so as to select an optimum tint block output density (low, normal, high) (S15). Normally the identification capability for the latent image in the copy can be increased by increasing the output density of the tint block. According to the selected tint block output density (low, normal or high), the print driver program 32 selects one of the latent image portion and the background portion dither matrix pairs shown in FIG. 7, FIG. 8 and FIG. 9. In the background portion dither matrices 34-1, 34-2 and 34-3, the screen ruling of the second dots D2 is 53 lpi, 61 lpi or 71 lpi, and the output density of the image of the background portion generated thereby sequentially becomes low, normal and high.

The printer driver 32 sets the input grayscale value of the tint block in response to the selection of the tint block output density by the user (S16). Specifically, responding to the selection of "low", "normal" or "high" of the tint block image output density by the user, the printer driver 32 selects the background portion dither matrix 34-1, 34-2 or 34-3, and sets the input grayscale value to 12, 8 or 9 respectively corresponding to the selection. As mentioned above, for the input grayscale values, the printer driver 32 may store the default setting values of the printer manufacturer before shipment, for each of the provided background portion dither matrices, in a predetermined storage area of the host computer, and acquire a value when the tint block is generated. The input grayscale values of this storage area may be updated according to the age deterioration of the printer engine characteristics. Corresponding to the input grayscale value, the latent image portion, which has the half tone dots (first dots D1) having a size corresponding to the input grayscale value, is generated based on the dot clustered latent image portion dither matrix 33-1, 33-2 or 33-3. In other words, setting the input grayscale value of the tint block responding to the selection of the tint block output density by the user means selecting a dot image comprised of first dots having a size corresponding to the selected tint block output density.

The thresholds of the latent image portion dither matrices 33-1, 33-2 and 33-3 in FIG. 7, FIG. 8 and FIG. 9 are 1 to 128, 1 to 98 and 1 to 72 respectively. However these thresholds may be standardized to 1 to 256. In other words, thresholds of all the latent image portion dither matrices are in a 1~256 range. The matrix size is still 16×16, 14×14 and 12×12, and the grayscale resolution thereof is still 128, 98 and 72. If the latent image portion dither matrices are constructed like this, the input grayscale values are also different from the above mentioned case. The input grayscale value, however, gradually increases corresponding to the output densities "low", "normal" and "high".

In the background portion dither matrix 34, the thresholds are only 1 and 255, so if the input grayscale value is in the range of 1 to 254, a pixel dot is generated in a pixel of which threshold is 1. In other words, the image of the background portion is an image comprised of predetermined second dots D2 and third dots D3. For the input grayscale value, images of the background portion and images using a latent image portion dither matrix created for various input grayscale values are output by the printer before the printer is shipped, or at a predetermined timing during the period of using the printer, the printer driver receives the result of measuring the density of these images measured by a colorimeter, and determines the input grayscale value with which the density measurement result matches best between the output image of the background portion and the output image of the latent image portion. The user may decide the input grayscale value so that the output density of the background portion and the output density of the latent image portion becomes visually the same, without using a colorimeter. In this case, the printer driver receives the specifications of the input grayscale value determined by the user, and this is regarded as the input grayscale value to be set in S16.

The user selects a camouflage pattern (S17), and selects a color of the tint block (e.g. black, cyan, magenta) (S18). When S10 to S17, including the input by the user, ends and the printer driver program acquires the tint block setting information from the user, the printer driver 32 executes the tint block image generation processing (S19). The tint block image generation processing is performed according to the flow chart in FIG. 14.

Figure 14:
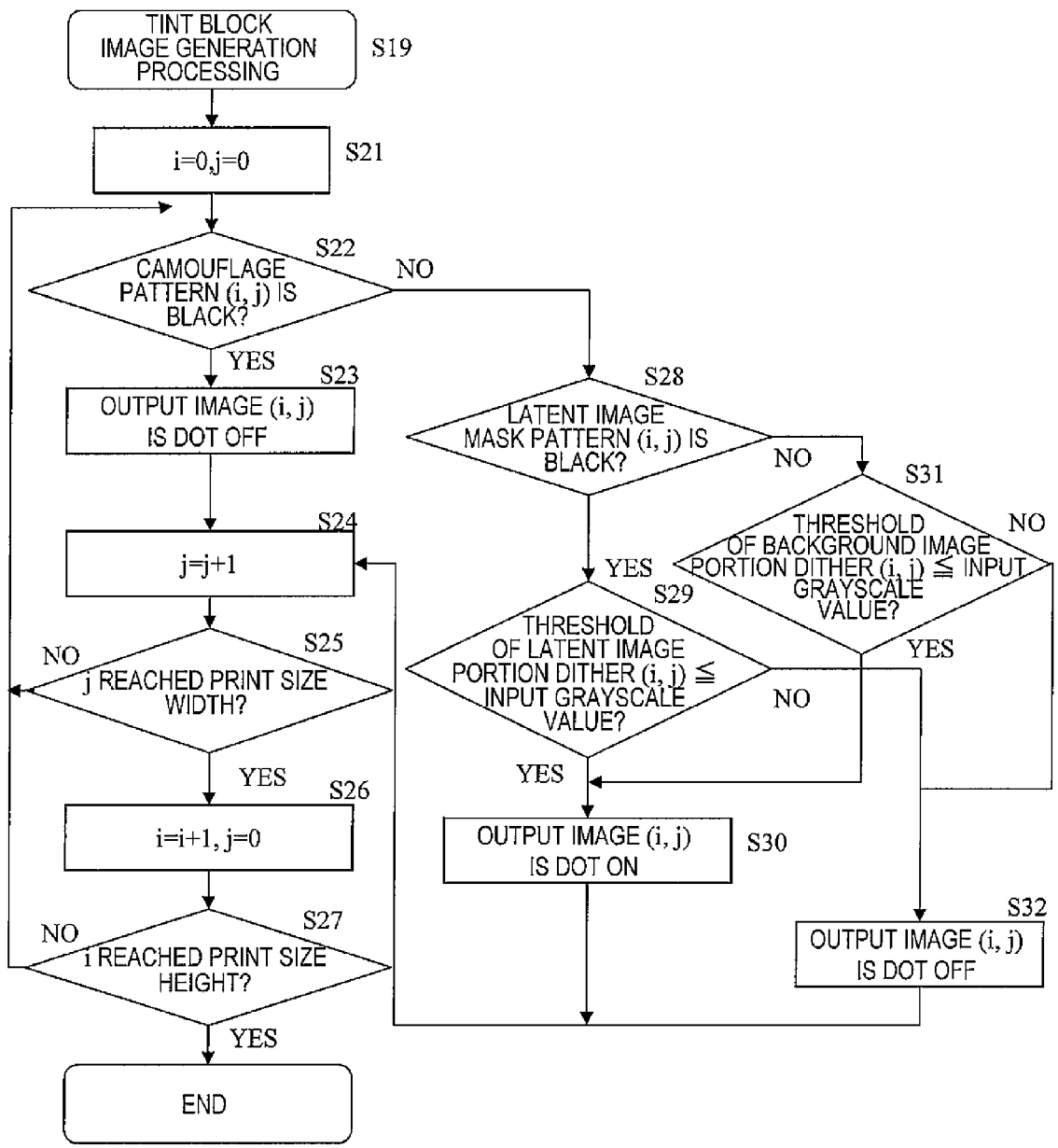
FIG. 14 is a flow chart depicting a tint block image generation processing according to the present embodiment.

FIG. 14 is a flow chart of the tint block image generation processing according to the present embodiment. FIG. 15 is a diagram describing the tint block image generation processing in FIG. 14. FIG. 15A shows a tint block image where a plurality of latent image mask patterns 10 are arranged in a sequence in A4 print size 60. In the case of an A4 size, there are 4720 dots of pixels in the horizontal direction and 6776 dots of pixels in the vertical direction. FIG. 15B shows the positional relationship of the latent image mask pattern 10 at the upper left in FIG. 15A, and the camouflage pattern 12 which is arranged as tiles. The latent image mask pattern 10 is a square pattern having 2030 dots of pixels in the horizontal direction, and 2030 dots of pixels in the vertical direction. The camouflage pattern 12, on the other hand, is a square pattern having 215 dots of pixels in the horizontal direction and 215 dots of pixels in the vertical direction, as shown in FIG. 15C, where the pattern portion of the camouflage pattern has black information and the other portion has white information.

FIG. 15D is an enlarged view of the upper left edge area of FIG. 15C. The latent image portion dither matrix 33 and the background portion dither matrix 34, where the tint block density is "normal", are both 14 cell×14 cell matrices, and each cell of the matrices corresponds to a pixel as if being pasted like a tile sequentially from the left. Since the dither matrices 33 and 34 of the latent image portion and the background portion have the same matrix size, the correspondence relationship with pixels matches perfectly, as shown in FIG. 15D. As a result, the first dots D1 generated based on the latent image portion dither matrix and the second dots D2 generated based on the background portion dither matrix are arranged at positions on the same displacement vectors in the tint block image, and match in spatial frequency and phase.

As mentioned above, when the output density of the tint block is selected, a pair of the background portion dither matrix 34 and the latent image portion dither matrix 33 is selected, and the input grayscale values corresponding to this pair are set. The printer driver compares the input grayscale values and the threshold values of the dither matrices 33 and 34, and sets the pixel dot to ON if the input grayscale value is equal to or greater than the threshold, and sets the pixel dot to OFF if the input grayscale value is less than the threshold. The comparison target dither matrix is selected according to black or white of the latent image mask pattern. The pattern 12A (black) of the camouflage pattern 12 is set to void, where the dots of the latent image portion or the background portion are not generated.

According to the flow chart in FIG. 14, the tint block image generation processing S19 will be described. The indexes i and j of the pixels of the tint block image are initialized to i=0 and j=0 respectively (S21). Then if the camouflage pattern at pixel (i, j) is black (YES in S22), the tint block image data (i, j) unconditionally becomes dot OFF. In case where the camouflage pattern is not black (NO in S22), if the latent image mask pattern is black (YES in S28), the threshold of the corresponding cell of the latent image portion dither matrix and input grayscale are compared (S29), and if the latent image portion mask pattern is not black (NO in S28), the threshold of the corresponding cell of the background portion dither matrix and the input grayscale are compared (S31). If the input grayscale value is equal to or more than the threshold in both comparisons, the tint block image data (i, j) becomes dot ON (S30), and if the input grayscale value is less than the threshold, the tint block image data (i, j) becomes dot OFF (S32).

In other words, in the latent image portion, first dots (half tone dots) having a size corresponding to the input grayscale value are generated, and in the background portion, second dots and third dots, arranged at fixed positions based on the background portion dither matrix selected regardless the input grayscale value, are generated.

When the above processing completes, the index j in the row direction of the pixels is incremented (S24), and the same processing is repeated until the index j reaches the print size width (S25). When the index j reaches the print size width (YES in S25), the index i in the column direction is incremented, and the index j in the row direction is reset to 0 (S26), and the same processing is repeated. When the index i in the column direction reaches the print size height (YES in S27), one page of tint block image generation processing completes. In this way, the processing target pixels are processed from the upper left in the raster scan direction, and each pixel is set to dot ON or OFF.

In the flow chart in FIG. 14, the input grayscale value and the threshold of the background portion dither matrix are compared for the pixels of the background portion, and it is judged whether the pixel dot is ON or OFF. However, as described in FIGS. 7, 8 and 9, if the background portion dither matrix 34 has only two types of thresholds, 1 and 255, and the pixel dot becomes ON if the processing target pixel (i, j) corresponds to the threshold 1 of the matrix, and the pixel dot becomes OFF if the processing target pixels (i, j) correspond to the threshold 255 of the matrix. Therefore a value of each cell of the background portion dither matrix may be a 1-bit value to indicate dot ON or dot OFF, and the tint block image data (i, j) may be set to pixel dot ON or OFF depending on which cell of dot ON or dot OFF of the background portion dither matrix the processing target pixels correspond to.

Figure 22:
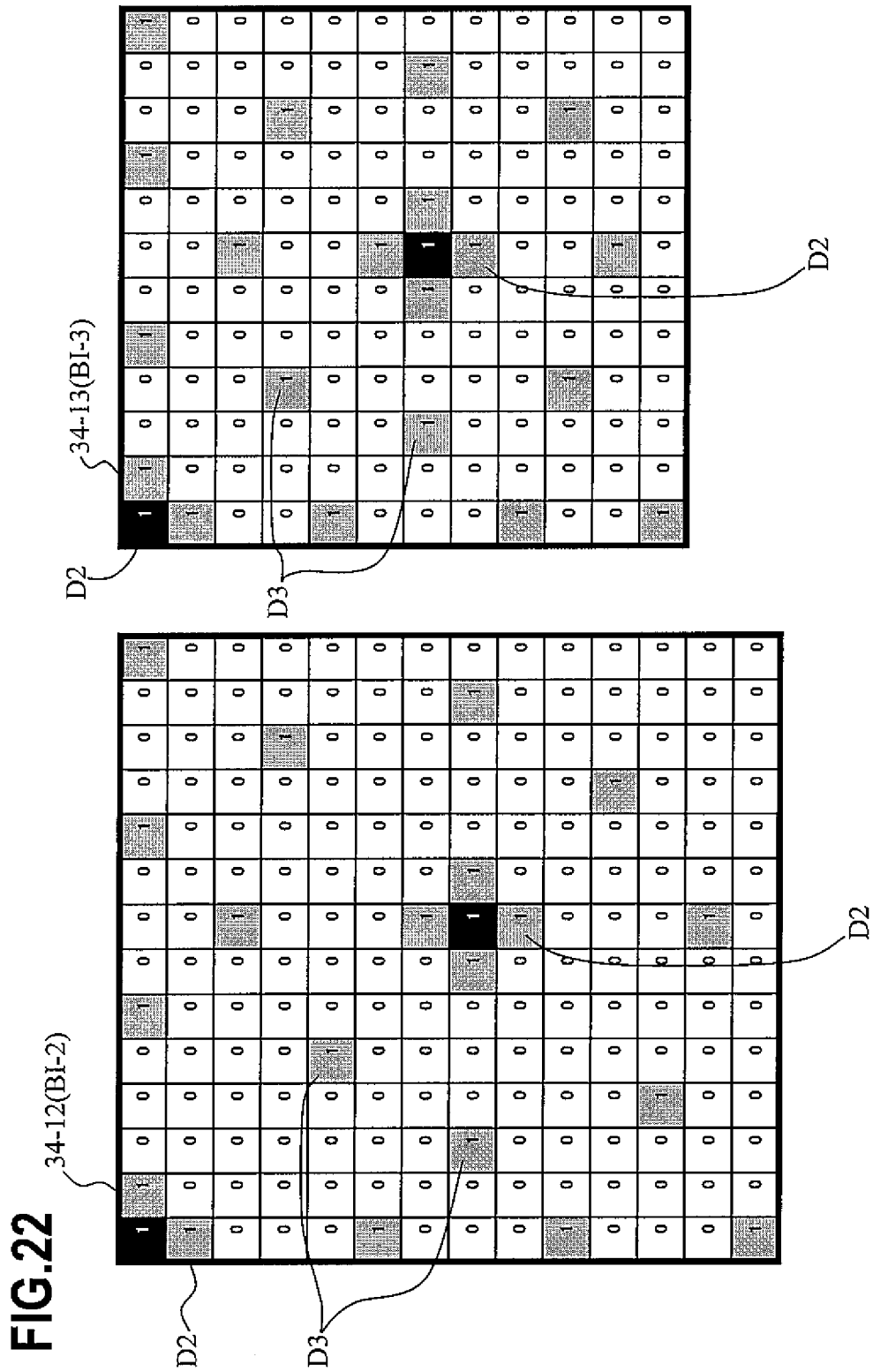
FIG. 22 shows a variant form of a background portion dither matrix.

FIG. 22 shows a variant form of the above mentioned background portion dither matrices. As FIG. 8 and FIG. 9 show, in the background portion, the value of the input grayscale value does not influence the tint block image generation processing. So the cell of the background portion dither matrix can be set to 1-bit data of dot ON/OFF, and if the latent image mask pattern is black (background portion), the data of the cell of the background portion dither matrix is set to the tint block image data (i, j). In this case, the background portion dither matrix is substantially the same as the background image data. And a step of generating the output grayscale according to the comparison of the input grayscale and the threshold of the background portion dither matrix is unnecessary. The background portion dither matrices 34-12 and 34-13 shown in FIG. 22 correspond to the background portion dither matrices 34-2 and 34-3 shown in FIG. 8 and FIG. 9. The background portion dither matrix 34-1 in FIG. 7 can also be constructed in the same way.

For the latent image portion, the tint block image data (i, j), for forming the first dots D1 comprised of half tone dots having a size according to the input grayscale value, is generated, referring to the dot clustered dither matrix 33. In other words, the image of the latent image portion having the output density corresponding to the input grayscale value is generated. The tint block image data of the latent image portion may be generated as follows. In other words, the input value of the latent image portion can be set to the set values which were fixed before shipment of the printer, for each of the plurality of background portion dither matrices shown in FIG. 8, FIG. 9 or FIG. 22. In this case, the data of the cell of the latent image portion dither matrix can be set to 1-bit data to indicate dot ON or OFF.

Figure 23:
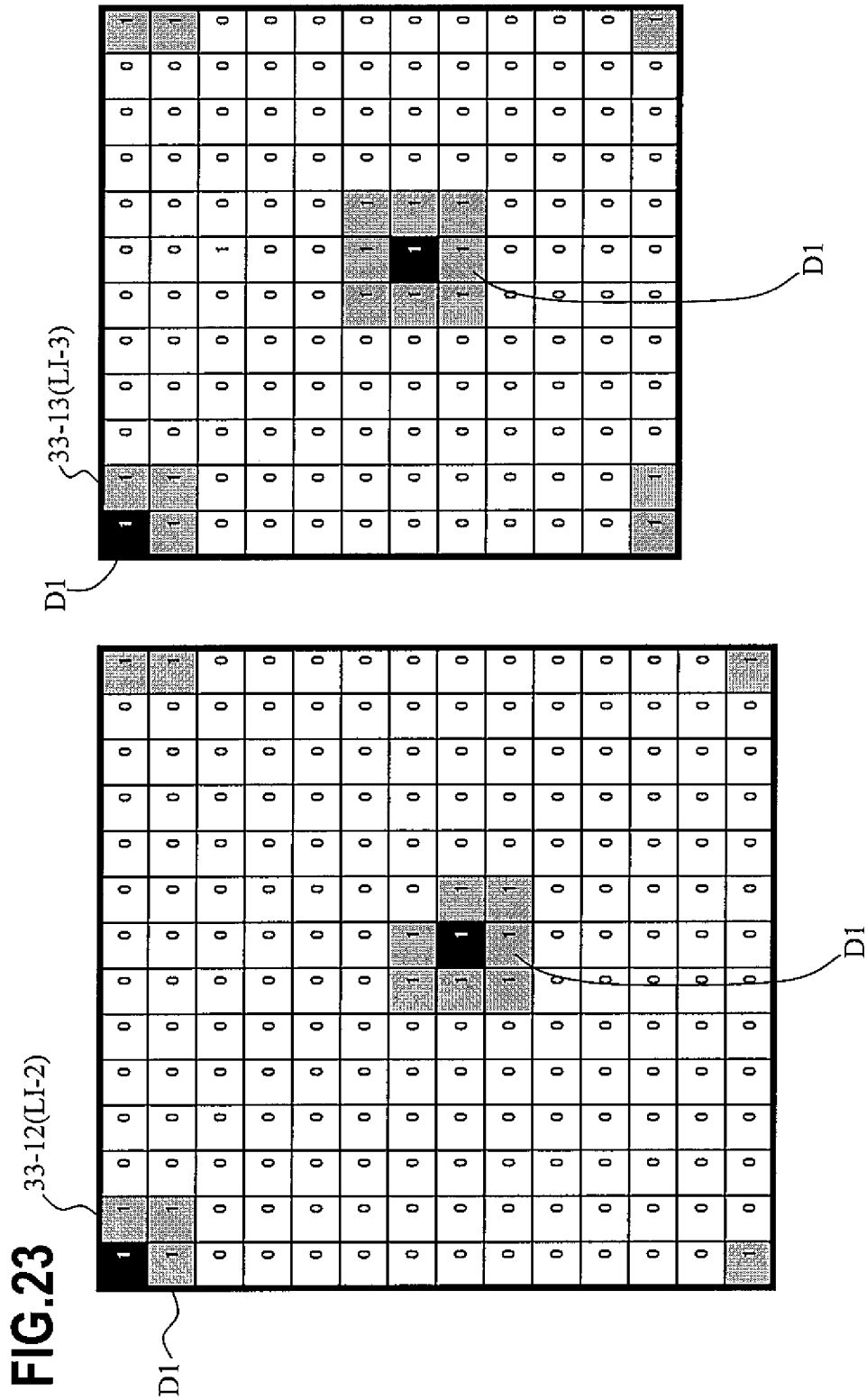
FIG. 23 shows a variant form of a latent image portion dither matrix.

FIG. 23 shows the variant form of the above mentioned latent image portion dither matrices. In the case of the background portion dither matrix 34-12 in FIG. 17, the input grayscale value of the latent image portion is set to "8", so the corresponding latent image portion dither matrix 33-12 becomes equivalent to the latent image portion dither matrix 33-2 in FIG. 8, and the first dot D1 is comprised of 8 pixel dots. However, the data of each cell of the latent image portion dither matrix 33-12 is "1" or "0" to indicate dot ON or OFF. On the other hand, in the case of the background portion dither matrix 34-13 in FIG. 22, the input grayscale value of the latent image portion is set to "9", for example, so the first dot D1 of the corresponding latent image portion dither matrix 33-12 is comprised of 9 pixel dots.

If the latent image mask pattern is white (latent image portion), the data of the cell of the latent image portion dither matrix 33-12 or 33-13 is set to the tint block image data (i, j). In other words, in this case the latent image portion dither matrix data is substantially equivalent to the latent image data. And the step of generating the output grayscale according to the comparison of the input grayscale and the threshold in the latent image portion dither matrix is unnecessary. The latent image portion dither matrices 33-12 and 33-13 shown in FIG. 23 correspond to the latent image portion dither matrices 33-2 and 33-3 shown in FIG. 8 and FIG. 9. The latent image portion dither matrix 34-1 in FIG. 7 can also be constructed in the same way.

By the above processing, in the area where the camouflage pattern is white, the output image (ON/OFF of pixel dots) of the latent image portion and the background portion are generated according to the latent image mask pattern.

The tint block image generated in this way becomes the tint block image data which has one of dot ON/OFF for each pixel.

The generated tint block image data and the print target image data 36 are combined as follows.

After the print target image data is converted from the RGB bit map data having RGB grayscale values into CMYK bit map data having the colors of the printer, the tint block image is combined with the bit map data having a color of the tint block specified by the user (one of cyan, magenta and black, in the case of this example), out of the CMYK bit map data of the print target image data.

In this combining method, the dot ON data of the tint block image is converted into the grayscale value corresponding to the maximum density of the above mentioned bit map data, and the dot OFF data is converted into the grayscale value corresponding to the minimum density "0" of the bit map data. If the values of RGB are 8-bit grayscale values respectively in the printer, then the grayscale value corresponding to the maximum density is "255", and the grayscale value corresponding to the minimum density is "0". This tint block image data converted into the maximum grayscale value or the minimum grayscale value is overwritten by the grayscale data of the pixels having a grayscale value greater than the grayscale value "0" in the bit map data of the specified tint block color of the print target image data. By this, the tint block image is formed in the pixels having grayscale value "0" in the print target image, and the print target image is formed in the other pixels.

In another combining method, the tint block image data is overwritten on the bit map data with the specified tint block color of the print target image data. For example, if the print target image data is data to form a block character, the CMY bit map data has grayscale value "0" in all the pixels. Therefore the bit map data with the specified tint block color, out of CMY, does not have information of the print target image data, so all the bit map data having this color is replaced with the tint block image data.

The combining method is not limited to the above mentioned overwriting, but may blend the print target image and the tint block image at a predetermined ratio based on the type of image (e.g. text, image, graphic) and the grayscale value of each pixel of the print target image data. Only a portion where the grayscale value of the print target data is "0" for all of CMYK out of the bit map data having the specified tint block color, that is a portion where an image is not formed on the print media out of the print target image data, may be overwritten by the tint block data.

The combined image data is printed on the print media via binary processing (screen processing) of a printer.

Out of the combined image data, the portion comprised of only the tint block image is comprised of pixels having the maximum density grayscale value and the minimum grayscale value, so regardless what the threshold matrix of the screen processing is like, the grayscale is converted such that the density value of the portion having the maximum density "255" remains as this density value, and the portion having the minimum density "0" remains as density "0" even after screen processing. As a result, the tint block image generated in the tint block generation processing is printed on the print media.

EXAMPLES

The following are examples when the tint block image is generated using a pair of the latent image portion dither matrices 33-1, 33-2 or 33-3 and the background portion dither matrices 34-1, 34-2 or 34-3 shown in FIG. 7, FIG. 8 or FIG. 9, and the tint block image of the copy is generated by simulation to allow the pixel dots of the tint block image of the original to disappear at a predetermined ratio. In simulation, the image reproducing capability, which depends on the input resolution and the output resolution of copying, has a limitation, so a size of large dots (half tone dots) is decreased to a first ratio, and a size of small dots (half tone dots) is decreased to a ratio smaller than the first ratio, and micro dots (pixel dots) are allowed to disappear at a predetermined ratio.

FIG. 16 shows an original and a copy of the tint block image of the example. FIG. 17 is an enlarged view of the original and the copy of the tint block image. In FIG. 16 and FIG. 17, the background portion dither matrix 34-1 and the latent image portion dither matrix 33-1, which make the output density of the tint block image "low", are selected, and corresponding to this, the input grayscale value is set to "12", the tint block image data is generated by the comparison of both the dither matrices 33-1 and 34-1 and the input grayscale value, this tint block image 14 is printed, and the copy 18 thereof is generated by simulation. Therefore the screen ruling of the first dots D1 of the latent image portion LI and the screen ruling of the second dots D2 of the background portion BI are both 53 lpi. The original 14 of the tint block image and the copy thereof 18 are an image of the latent image "COPY". In FIG. 16 and FIG. 17, the original 14 and the partially enlarged view thereof 14X, and the copy thereof 18 and the partially enlarged view thereof 18X, are shown.

FIG. 17 shows the enlarged view 14X of the original of the tint block at the top, and the enlarged view 18X of the copy of the tint block at the bottom. In the original 14X, the first dots D1, which are half tone dots having a size corresponding to the input grayscale value "16" based on the dot clustered dither matrix 33, are formed in the latent image portion LI. The background portion BI, on the other hand, is comprised of large sized second dots D2 in a cross shape and 8 micro sized third dots D3, which are located fixedly among the second dots D2 in the vertical, horizontal and diagonal directions from the second dots D2 respectively. The first dots D1 and the second dots D2 are arranged at positions on the same displacement vectors, hence are arranged on the same screen rulings 100 and 102.

As FIG. 16 and FIG. 17 show, in the original 14 of the tint block image, the output density of the latent image portion LI and the output density of the background portion BI are the same. Also the first dots D1 of the latent image portion LI and the second dots D2 of the background portion BI have the same spatial frequency and phase, and are not arranged at positions which influence each other. Therefore in the boundary area of the latent image portion and the background portion, both dots D1 and D2 becoming close and overlapping does not occur. By this, the concealment capability for the latent image "COPY" in the original is maintained.

As the enlarged view 18X of the copy at the bottom in FIG. 17 shows, in the latent image portion LI, each first dot D1 at most loses 1 to 2 pixel dots, and the output density does not decrease very much. Whereas in the background portion BI, each second dot D2 loses 2 to 3 pixel dots, and many of the third dots D3 disappear. As a result, the output density in the background portion BI drops considerably in the copy. Hence in the copy, a major difference is generated in the output density between the latent image portion LI and the background portion BI, and identification capability for the latent image "COPY" increases.

Figure 19:
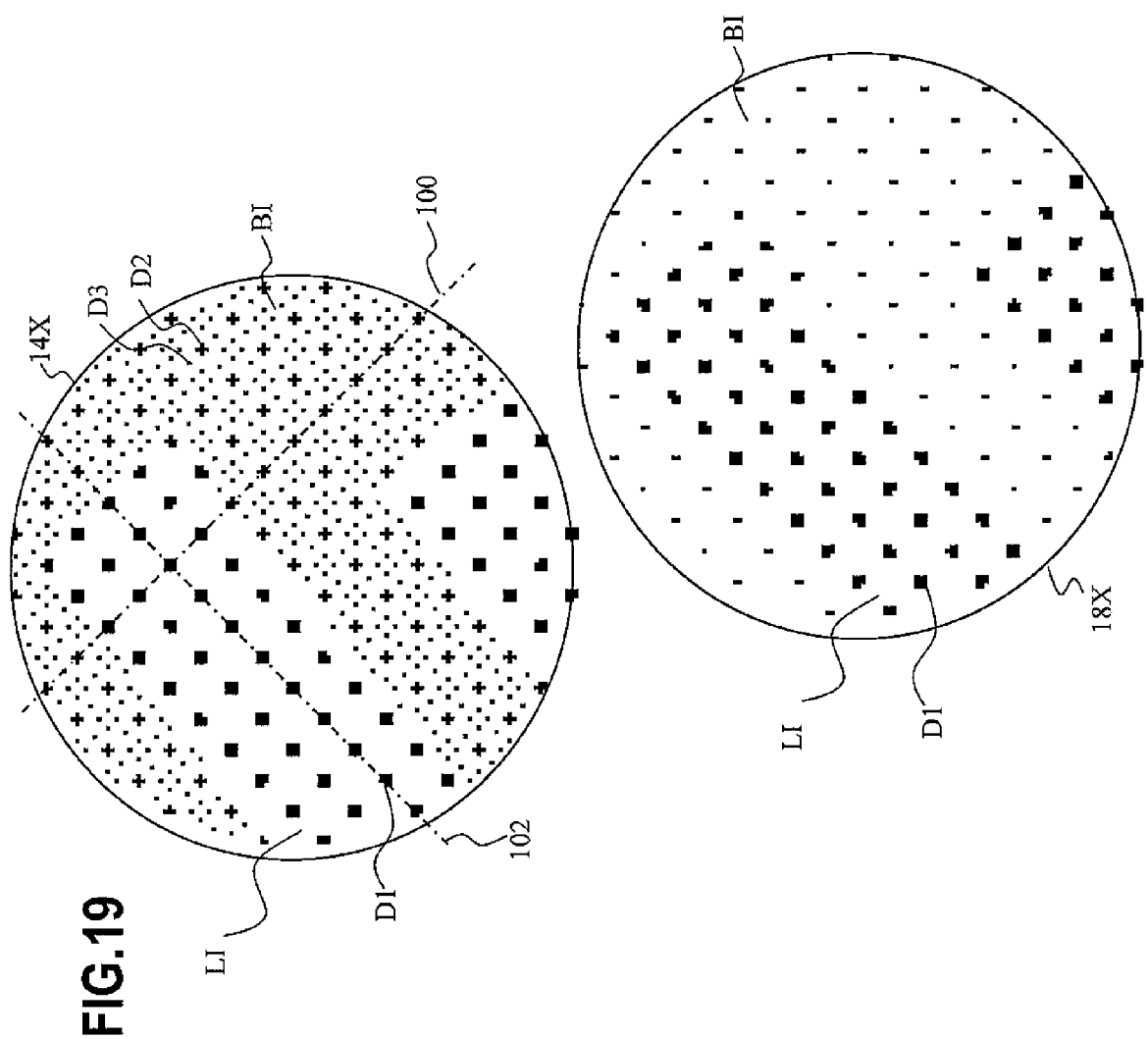
FIG. 19 is an enlarged view of the original and the copy of the tint block image in FIG. 18.

FIG. 18 shows an original and a copy of the tint block image according to an example. FIG. 19 is an enlarged view of the original and copy of the tint block image. In FIG. 18 and FIG. 19, the background portion dither matrix 34-2 and the latent image portion dither matrix 33-2, to make the output density of the tint block image "normal", are selected, and corresponding to this output density, the input grayscale value is set to "8", and the tint block image 14 of the original is generated by the comparison of both dither matrices 33-2 and 34-2 with the input grayscale value "8", and the copy thereof 18 is generated by simulation. Therefore the screen ruling of the first dots D1 of the latent image portion LI and the screen ruling of the second dots D2 of the background portion BI are both 61 lpi.

Figure 20:
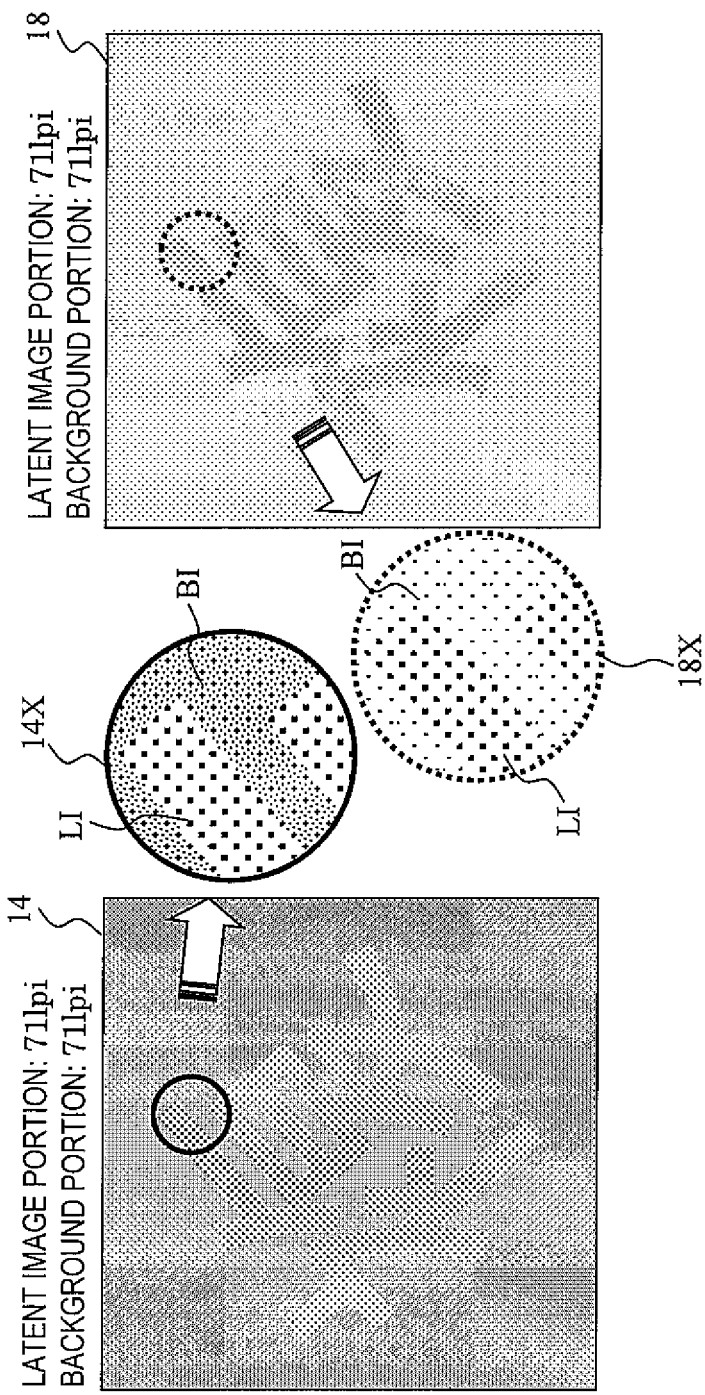
FIG. 20 shows an original and a copy of a tint block image according to an example.
Figure 21:
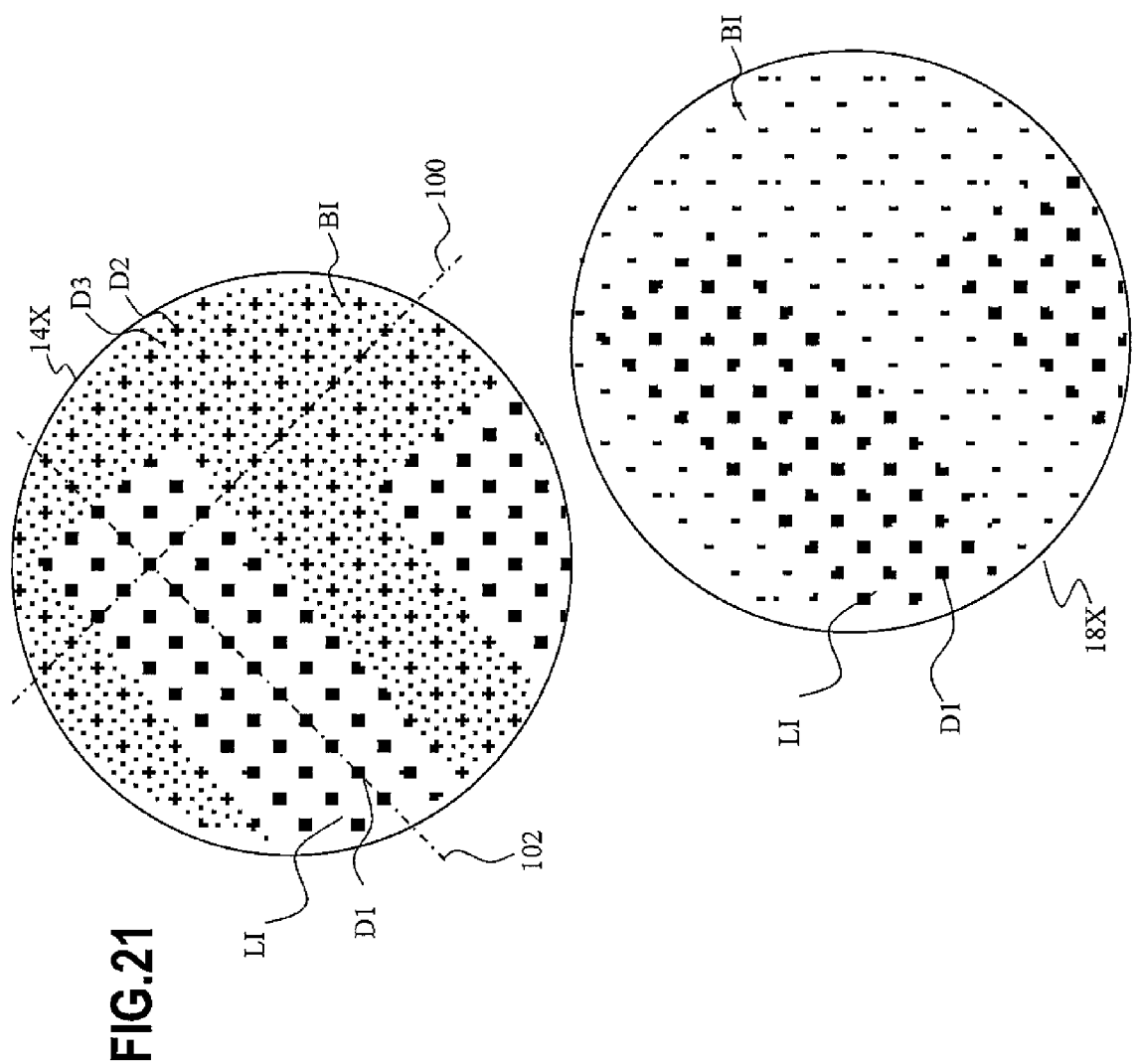
FIG. 21 is an enlarged view of the original and the copy of the tint block image in FIG. 20.

FIG. 20 shows an original and a copy according to an example. FIG. 21 is an enlarged view of the original and copy of the tint block image. In FIG. 20 and FIG. 21, the background portion dither matrix 34-3 and the latent image portion dither matrix 33-3, to make the output density of the tint block image "high", are selected, and corresponding to this output density, the input grayscale value is set to "9", and the tint block image 14 of the original is generated by the comparison of both dither matrices 33-3 and 34-3 with the input grayscale value "9", and the copy thereof 18 is generated by simulation. Therefore the screen ruling of the first dots D1 of the latent image portion LI and the screen ruling of the second dots D2 of the background portion BI are both 71 lpi.

In the tint block image corresponding to the output image "normal" in FIG. 18 and FIG. 19, the densities of the first dots D1 and the second dots D2 are higher than those of FIG. 16 and FIG. 17. The dots D1 and D2 are both arranged at positions on common displacement vectors, and have common screen rulings 100 and 102. In the tint block image corresponding to the output density "high" in FIG. 20 and FIG. 21, the densities of the first dots D1 and the second dots D2 are even higher. The dots D1 and D2 are arranged at the positions on common displacement vectors, and have common screen rulings 100 and 102. In the original, the micro sized third dots D3 are formed in the background portion BI, so in the copy thereof, the third dots D3 effectively disappear, which increases the identification capability of the latent image. In the examples in FIG. 18 to FIG. 21 as well, just like the example in FIG. 16 and FIG. 17, the concealment capability for the latent image in the original is high, and the identification capability for the latent image in the copy is also high.

As the enlarged views of these examples show, the output density of the tint block image is changed depending on the screen ruling and density of the second dots D2 in the background portion BI and those of the first dots D1 in the latent image portion LI. Corresponding to the change of the output density, a pair of the latent image portion dither matrix and background portion dither matrix, where the first and second dots are arranged at positions on the same displacement vectors, is selected. Therefore in the original a high output density area or low output density area are not generated in the boundary area of the latent image portion and the background portion. In the background portion, the large sized second dots D2 and micro sized third dots D3 are dispersed at fixed positions, and are not influenced much by the characteristics of the printer engine even if the output density is increased, and the concealment capability for the latent image in the original can be maintained as high.

As described above, according to the present embodiment, the background portion of the forgery inhibited tint block is comprised of large sized second dots, which do not disappear very much during copying, and micro sized third dots, which easily disappear during copying. The second dots in the background portion and the first dots in the latent image portion are arranged at positions on common displacement vectors, and have the same spatial frequency and phase. The large dots and small dots in the background portion are arranged at fixed positions, so that they do not influence each other. By this, the output density of the tint block image can be increased, and both the high concealment capability for the latent image in the original and high identification capability for the latent image in the copy can be implemented.

In other words, in the background portion, the screen ruling of the large sized second dots is decreased so that influence by the characteristics of the printer engine is decreased, and the generation of color unevenness in the background portion is prevented, and the screen ruling of the background portion and the screen ruling of the latent image portion are set to be closer or same, so that the difference in hue and saturation between the background portion and the latent image portion are prevented, and the concealment capability for the latent image in the original can be increased. Also by creating micro sized third dots in the background portion, a drop in output density during copying is increased, so as to increase the identification capability for the latent image in the copy. Since the output density of the entire tint block image can be increased, the identification capability for the latent image in the copy can be further increased. Moreover, the second dots and the first dots are arranged in positions on the common displacement vectors, so these dots becoming close and influencing each other, which causes an increase in density in the boundary area of the latent image portion and background portion, or these dots becoming excessively distant from each other, causing a decrease in density, can be prevented.

What is claimed is:

1. A non-transitory computer readable storage medium that stores a tint block image generation program for generating tint block image data for forming, on a print medium, a tint block image including a latent image portion which is reproduced by copying, and a background portion of which copy output density drops, the program causing a computer to execute:
    a latent image portion generation step of generating data of a plurality of first dots in the latent image portion based on a dot clustered screen; and
    a background portion generation step of generating data of a plurality of second dots and data of a plurality of third dots dispersed among the second dots and having a size smaller than the second dots in the background portion, wherein
    one first dot and another first dot adjacent to the one first dot in the latent image portion are arranged at positions on predetermined displacement vectors in an area of the tint block image,
    one second dot and another second dot adjacent to the one second dot in the background portion are arranged at positions on the predetermined displacement vectors in the area of the tint block image, and
    the first dot and the second dot adjacent to the first dot are arranged at positions on the predetermined displacement vectors.

2. The non-transitory computer readable storage medium that stores the tint block image generation program according to claim 1, wherein the plurality of third dots in the background portion are dispersed at fixed positions among the plurality of second dots.

3. The non-transitory computer readable storage medium that stores the tint block image generation program according to claim 1, further comprising a density setting step of, in response to a density setting input for a tint block image, selecting a screen ruling corresponding to the density setting input, wherein
    in the background portion generation step, the data of the plurality of second dots having the screen ruling selected in the density setting step is generated, and
    in the latent image portion generation step, the data of the plurality of first dots having the screen ruling selected in the density setting step and having a size corresponding to the output density on the print medium of the background portion, is generated.

4. The non-transitory computer readable storage medium that stores the tint block image generation program according to claim 1, wherein
    in the latent image portion generation step, the data of the plurality of first dots is generated, based on an input grayscale value, by referring to a latent image portion dither matrix in which a low threshold to a high threshold are arranged such that the dots can be clustered,
    in the background portion generation step, the data of the plurality of second and third dots is generated, based on the input grayscale value, by referring to a background portion dither matrix in which a minimum threshold is arranged at positions where the second and third dots are formed,
    the tint block image generation program further causes the computer to execute a density setting step of, in response to a density setting input for a tint block image, selecting a screen ruling corresponding to the density setting input,
    in the background portion generation step, the background portion dither matrix for providing the screen ruling selected in the density setting step to the plurality of second dots, is selected and referred to, and
    in the latent image portion generation step, the latent image portion dither matrix for providing the screen ruling selected in the density setting step to the plurality of first dots is selected and referred to, and the input grayscale value is further selected according to the output density on the print medium of the background portion.

5. A non-transitory computer readable storage medium that stores a tint block image generation program for generating tint block image data for forming, on a print medium, a tint block image including a latent image portion which is reproduced by copying, and a background portion of which copy output density drops, the program causing a computer to execute:

a latent image portion generation step of generating data of a plurality of first dots having a first size in the latent image portion; and a background portion generation step of generating, in the background portion, data of a plurality of second dots having a second size, which is smaller than the first size, and data of a plurality of third dots dispersed among the second dots and having a third size, which is smaller than the second size, wherein spatial frequency and phase of centers of adjacent first dots in the latent image portion are equal to spatial frequency and phase of centers of adjacent second dots in the background portion.

6. A tint block image generation device for generating, on a print medium, a tint block image including a latent image portion which is reproduced by copying, and a background portion of which copy output density drops, comprising:

a latent image portion generation unit which generates a plurality of first dots in the latent image portion on the print medium based on a dot clustered screen; and a background portion generation unit which generates a plurality of second dots and a plurality of third dots dispersed among the second dots and having a size smaller than the second dots in the back ground portion on the print medium, wherein one first dot and another first dot adjacent to the one first dot in the latent image portion are arranged at positions on predetermined displacement vectors in an area of the tint block image, one second dot and another second dot adjacent to the one second dot in the background portion are arranged at positions on the predetermined displacement vectors in the area of the tint block image, and the first dot and the second dot adjacent to the first dot are arranged at positions on the predetermined displacement vectors.

7. The tint block image generation device according to claim 6, wherein the plurality of third dots in the background portion are dispersed at fixed positions among the plurality of second dots.

8. The tint block image generation device according to claim 6, further comprising a density setting unit which, in response to a density setting input for a tint block image, selects a screen ruling corresponding to the density setting input, wherein the background portion generation unit generates the plurality of second dots having the screen ruling selected by the density setting unit, and the latent image portion generation unit generates the plurality of first dots having a screen ruling set by the density setting unit and having a size corresponding to the output density of the background portion.

9. The tint block image generation device according to claim 6, wherein the latent image portion generation unit generates the plurality of first dots, based on an input grayscale value, by referring to a latent image portion dither matrix in which a low threshold to a high threshold are arranged such that the dots can be clustered, the background portion generation unit generates the plurality of second and third dots, based on the input grayscale value, by referring to a background portion dither matrix in which a minimum threshold is arranged at positions where the second and third dots are formed, the tint block image generation device further comprises a density setting unit which, in response to a density setting input for a tint block image, selects a screen ruling corresponding to the density setting input, the background portion generation unit selects and refers to the background portion dither matrix for providing the screen ruling selected by the density setting unit to the plurality of second dots, and the latent image portion generation unit selects and refers to the latent image portion dither matrix for providing the screen ruling selected by the density setting unit to the plurality of first dots, and further selects the input grayscale value according to the output density of the background portion.

10. A tint block image generation device for generating, on a print medium, a tint block image including a latent image portion which is reproduced by copying, and a background portion of which copy output density drops, comprising:

a latent image portion generation unit which generates a plurality of first dots having a first size in the latent image portion on the print medium; and a background portion generation unit which generates, in the background portion on the print medium, a plurality of second dots having a second size, which is smaller than the first size, and a plurality of third dots dispersed among the second dots and having a third size, which is smaller than the second size, wherein spatial frequency and phase of centers of the adjacent first dots in the latent image portion are equal to spatial frequency and phase of centers of the adjacent second dots in the background portion.

11. A tint block image generation method for generating, on a print medium, a tint block image including a latent image portion which is reproduced by copying, and a background portion of which copy output density drops, comprising:

a latent image portion generation step of generating a plurality of first dots in the latent image portion on the print medium based on a dot clustered screen; and a background portion generation step of generating a plurality of second dots and a plurality of third dots dispersed among the second dots and having a size smaller than the second dots in the back ground portion on the print medium, wherein one first dot and another first dot adjacent to the one first dot in the latent image portion are arranged at positions on predetermined displacement vectors in an area of the tint block image, one second dot and another second dot adjacent to the one second dot in the background portion are arranged at positions on the predetermined displacement vectors in the area of the tint block image, and the first dot and the second dot adjacent to the first dot are arranged at positions on the predetermined displacement vectors.

12. A tint block image generation method for generating, on a print medium, a tint block image including a latent image portion which is reproduced by copying, and a background portion of which copy output density drops, comprising:

a latent image portion generation step of generating a plurality of first dots having a first size in the latent image portion on the print medium; and a background portion generation step of generating, in the background portion on the print medium, a plurality of second dots having a second size, which is smaller than the first size, and a plurality of third dots dispersed among the second dots and having a third size, which is smaller than the second size, wherein spatial frequency and phase of centers of the adjacent first dots in the latent image portion are equal to spatial frequency and phase of centers of the adjacent second dots in the background portion.

13. A non-transitory computer readable storage medium that stores a tint block image generation program that can be read by a computer, for generating tint block image data for forming, on a print medium, a tint block image including a latent image portion and a background portion of which a copy output density drops more than a copy output density of the latent image portion, the program causing a computer to execute:
   a latent image portion generation step of generating, in the latent image portion, latent image data for forming a latent image which has a plurality of first dots and which has a predetermined output density; and
   a background portion generation step of generating, in the background portion, background image data for forming a background image which has a plurality of second dots and a plurality of third dots dispersed among the second dots and having a size smaller than the second dots, and which has a predetermined output density, wherein
   one first dot and another first dot adjacent to the one first dot in the latent image portion are arranged at positions on predetermined displacement vectors in an area of the tint block image,
   one second dot and another second dot adjacent to the one second dot in the background portion are arranged at positions on the predetermined displacement vectors in the area of the tint block image, and
   the first dot and the second dot adjacent to the first dot are arranged at positions on the predetermined displacement vectors.

14. A non-transitory computer readable storage medium that stores a tint block image generation program for generating tint block image data for forming, on a print medium, a tint block image including a latent image portion and a background portion of which a copy output density drops more than a copy output density of the latent image portion during copying, the program causing a computer to execute:
   a latent image portion generation step of generating, in the latent image portion, latent image data for forming a latent image which has a plurality of first dots and which has a predetermined output density; and
   a background portion generation step of generating, in the background portion, background image data for forming a background image which has a plurality of second dots and a plurality of third dots dispersed among the second dots and having a size smaller than the second dots, and which has a predetermined output density, wherein
   spatial frequency and phase of centers of the adjacent first dots in the latent image portion are equal to spatial frequency and phase of centers of the adjacent second dots in the background portion.

15. The non-transitory computer readable storage medium that stores the tint block image generation program according to claim 13 or claim 14, wherein
   the program further causes the computer to execute a density setting step of, in response to a density setting input for a tint block image, setting a density set value,
   in the latent image portion generation step, out of first and second latent images having a first output density and a second output density greater than the first output density, respectively, the first or second latent image having the first or second output density, whichever corresponds to the density set value, is selected, and
   in the background portion generation step, out of first and second background images having third and fourth output densities corresponding to the first and second output densities, respectively, the first or second background image having the third or fourth output density, whichever corresponds to the density set value, is selected.

* * * * *